United States Patent
Miyazato et al.

(10) Patent No.: US 8,925,503 B2
(45) Date of Patent: Jan. 6, 2015

(54) VARIABLE VALVE DEVICE FOR INTERNAL COMBUSTION ENGINE

(75) Inventors: Yoshiaki Miyazato, Toyota (JP); Toshio Imamura, Okazaki (JP); Yuu Yokoyama, Okazaki (JP); Masaki Numakura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/113,495

(22) PCT Filed: May 17, 2011

(86) PCT No.: PCT/JP2011/061299
§ 371 (c)(1),
(2), (4) Date: Oct. 23, 2013

(87) PCT Pub. No.: WO2012/157074
PCT Pub. Date: Nov. 22, 2012

(65) Prior Publication Data
US 2014/0048026 A1    Feb. 20, 2014

(51) Int. Cl.
| | |
|---|---|
| F01L 1/34 | (2006.01) |
| F01L 1/344 | (2006.01) |
| F02D 13/02 | (2006.01) |
| F02D 37/02 | (2006.01) |
| F02P 5/15 | (2006.01) |
| F01L 13/00 | (2006.01) |
| F02D 41/00 | (2006.01) |

(52) U.S. Cl.
CPC ......... *F01L 1/34409* (2013.01); *F02D 13/0238* (2013.01); *F02D 37/02* (2013.01); *F02P 5/1504* (2013.01); *F01L 1/3442* (2013.01); *F01L 13/0021* (2013.01); *F02D 2041/001* (2013.01); *F02D 2250/21* (2013.01); *Y02T 10/46* (2013.01); *Y02T 10/18* (2013.01); *F01L 2001/34459* (2013.01); *F01L 2001/34466* (2013.01); *F01L 2001/34469* (2013.01); *F01L 2001/34476* (2013.01)
USPC ...................... 123/90.15; 123/90.17; 464/160

(58) Field of Classification Search
USPC ............................ 123/90.15, 90.17; 464/160
See application file for complete search history.

(56) References Cited

U.S. PATENT DOCUMENTS 8,578,900 B2 * 11/2013 Kikuoka et al. ........... 123/90.17

FOREIGN PATENT DOCUMENTS

| | | |
|---|---|---|
| JP | 5-79371 A | 3/1993 |
| JP | 2001-132485 A | 5/2001 |

(Continued)

OTHER PUBLICATIONS

International Search Report of PCT/JP2011/061299, dated Jun. 21, 2011.

*Primary Examiner* — Ching Chang
(74) *Attorney, Agent, or Firm* — Sughrue Mion, PLLC

(57) ABSTRACT

A variable valve actuation device for an internal combustion engine includes a variable valve timing mechanism and a valve timing restricting mechanism. When the operating state of the variable valve timing mechanism is in the phase restricting state and the operating state of the variable valve timing mechanism is changed to the phase releasing state on the basis of pressing the accelerator pedal, a torque limiting control is then performed to limit an increase in the torque of the internal combustion engine. With this control the rate of increase of the torque is set less than the rate of increase of the torque corresponding to the operation of pressing the accelerator pedal by retarding and correcting the ignition timing. Thus, when the operating state of the variable valve timing mechanism is changed from the phase restricting state to the phase releasing state, thereby reducing discomfort experienced by the driver.

10 Claims, 9 Drawing Sheets

(56) References Cited

FOREIGN PATENT DOCUMENTS

| | | |
|---|---|---|
| JP | 2001-329871 A | 11/2001 |
| JP | 2010-127252 A | 6/2010 |
| JP | 2010-242714 A | 10/2010 |

\* cited by examiner

Fig.6(a)

|  | First Fixing Mode A1 | Second Fixing Mode A2 | Advancing Mode A3 | Maintaining Mode A4 | Retarding Mode A5 |
|---|---|---|---|---|---|
| Advance Chamber | Supply | Supply Slightly | Supply | Close | Drainage |
| Retard Chamber | Drainage | Drainage | Drainage | Close | Supply |
| Release Chamber | Drainage | Drainage | Supply | Supply | Supply |

Fig.6(b)

|  | First Fixing Mode A1 | Second Fixing Mode A2 | Advancing Mode A3 | Maintaining Mode A4 | Retarding Mode A5 |
|---|---|---|---|---|---|
| Variable Valve Timing Mechanism | Advance | Advance Slightly | Advance | Maintain | Retard |
| Restricting Pin | Protrude | Protrude | Retract | Retract | Retract |

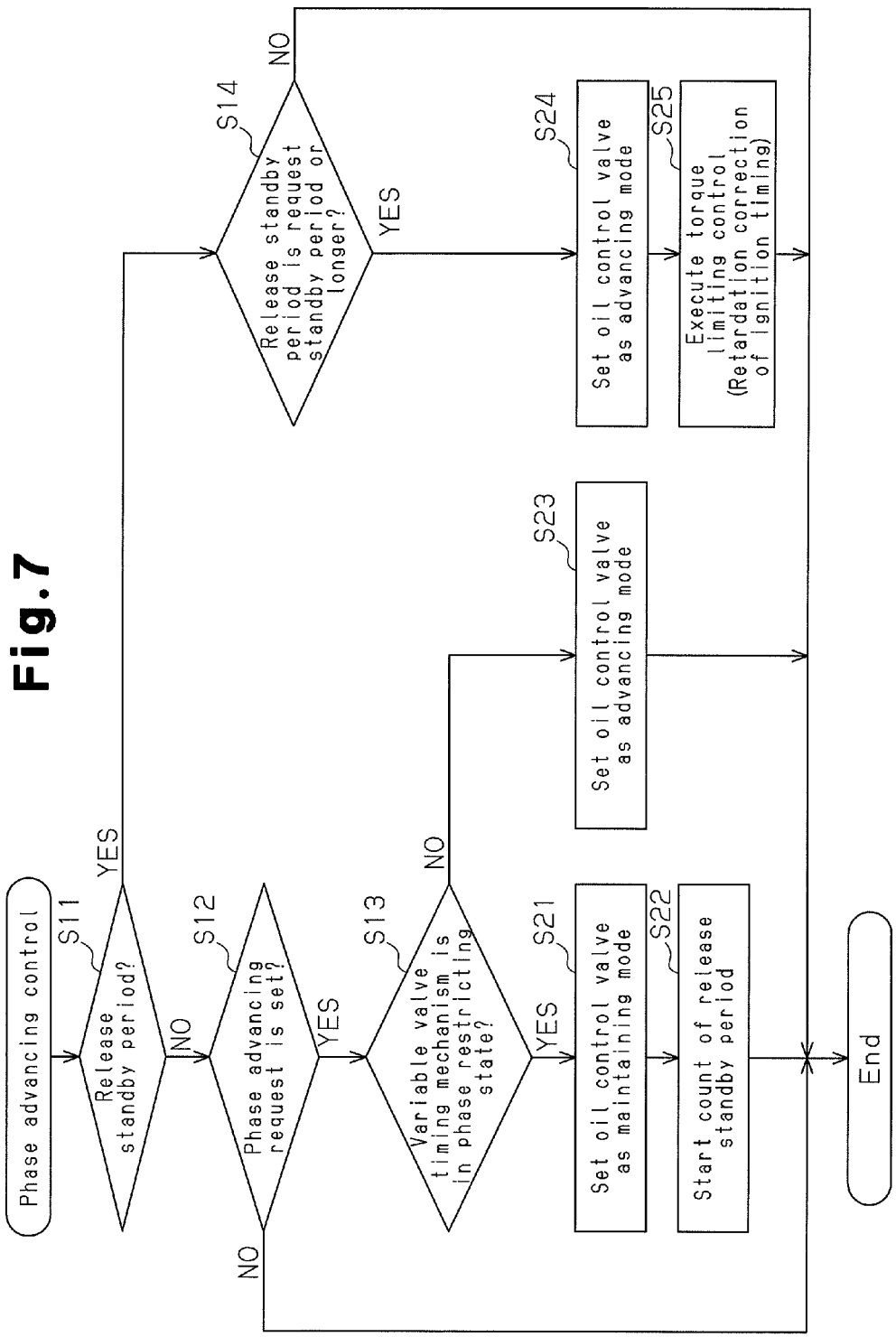

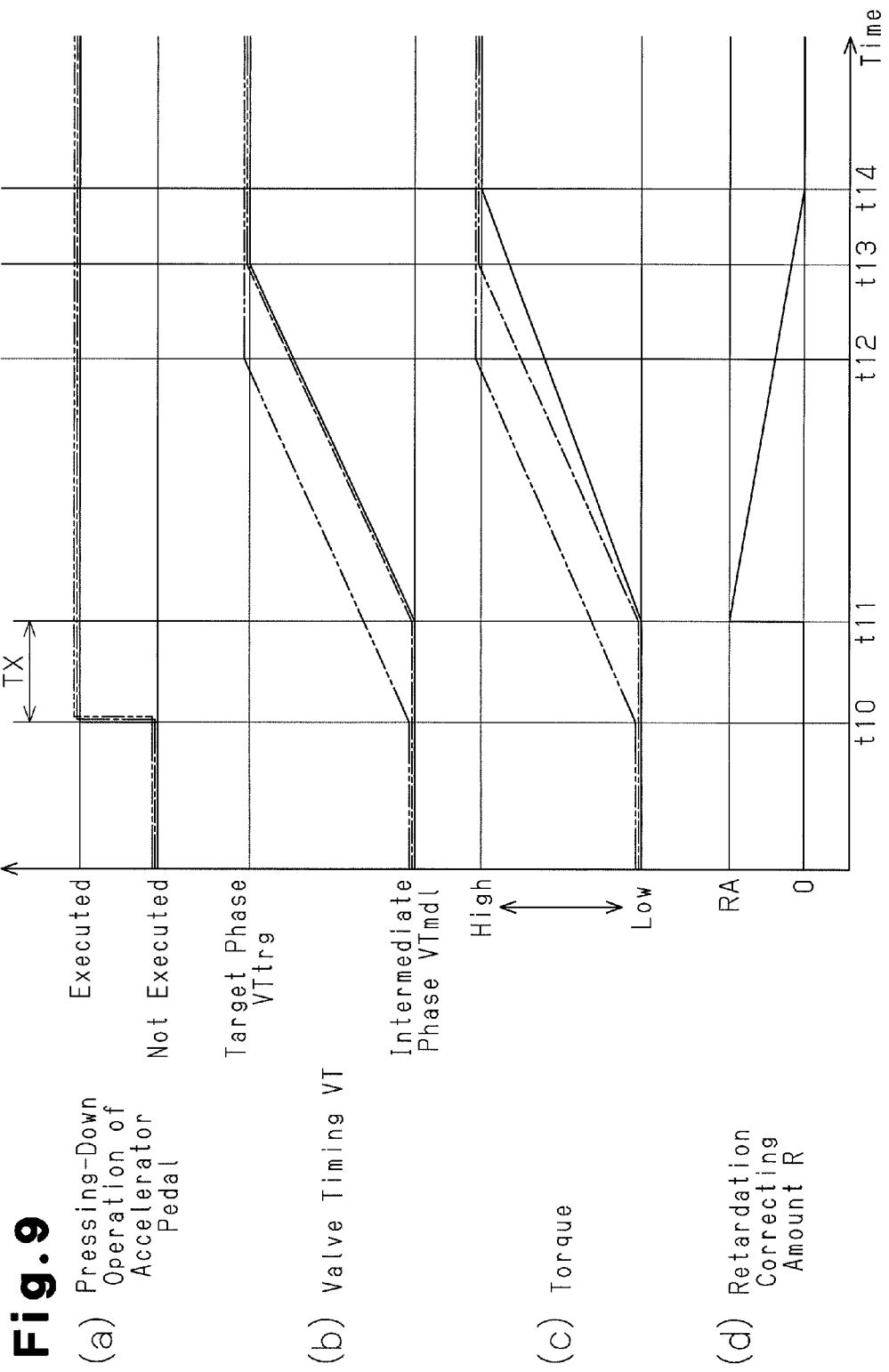

VARIABLE VALVE DEVICE FOR INTERNAL COMBUSTION ENGINE

CROSS REFERENCE TO RELATED APPLICATIONS

This application is a National Stage of International Application No. PCT/JP2011/061299 filed May 17, 2011, the contents of all of which are incorporated herein by reference in their entirety.

TECHNICAL FIELD

The present invention relates to a variable valve actuation device for an internal combustion engine including a phase changing mechanism that changes valve timing of an intake valve, and a phase restricting mechanism that restricts advance of the valve timing from a specific phase.

BACKGROUND ART

The variable valve actuation device as described in Patent Document 1 is known.

The disclosed variable valve actuation device includes a phase changing mechanism that changes the valve timing of an intake valve, a phase restricting mechanism that fixes the valve timing at a specific phase, and a hydraulic pressure control valve that changes the operating states of the phase changing mechanism and the phase restricting mechanism.

PRIOR ART DOCUMENT

Patent Document

Patent Document 1: Japanese Laid-Open Patent Publication No. 2010-127252

SUMMARY OF THE INVENTION

Problems that the Invention is to Solve

It is supposed that, in a vehicle having the above-described variable valve actuation device, a request to advance the valve timing is set when the valve timing is fixed at the specific phase by the phase restricting mechanism. A specific example of such a state includes the case where an accelerator pedal is pressed down when an engine operating state is in an idle operating state and the valve timing is fixed at the specific phase by the phase restricting mechanism.

In the above-described state, a command to change the operating state of the phase changing mechanism from a phase restricting state to a phase releasing state is transmitted from a control device of the internal combustion engine to the hydraulic pressure control valve. When the hydraulic pressure control valve operates in response to the command, the operating state of the phase changing mechanism is changed from the phase restricting state to the phase releasing state. A predetermined period is required until the change in the operating state is completed.

Therefore, the timing when the advance of the valve timing is started, that is, the timing when a torque of the internal combustion engine starts to increase in response to the advance of the valve timing is delayed relative to a pressing-down operation of the accelerator pedal.

After the operating state of the phase changing mechanism is changed to the phase releasing state, the valve timing is advanced toward target valve timing. This allows the torque of the internal combustion engine to increase corresponding to an advance amount of the valve timing.

Thus, a vehicle driver experiences an increase in torque based on the advance of the valve timing after the predetermined period from when he/she presses down the accelerator pedal. This may cause the vehicle driver to experience a feeling of discomfort.

Accordingly, it is an objective of the present invention to provide a variable valve actuation device of an internal combustion engine that is capable of reducing the feeling of discomfort experienced by the vehicle driver when the operating state of the phase changing mechanism is changed from the phase restricting state to the phase releasing state.

Means for Solving the Problems

Means for achieving the above-described object will be described below.

The present invention provides a variable valve actuation device for an internal combustion engine. The device includes a phase changing mechanism that changes valve timing of an intake valve and a phase restricting mechanism that restricts the valve timing from being more advanced than a specific phase. An operating state of the phase changing mechanism in which the phase restricting mechanism restricts the valve timing from being advanced is defined as a phase restricting state. An operating state of the phase changing mechanism in which the valve timing is allowed to be more advanced than the specific phase is defined as a phase releasing state. An operation executed by a vehicle driver to increase output of the internal combustion engine is defined as an output increase requesting operation. The variable valve actuation device includes a control section. After the output increase requesting operation is executed while the operating state of the phase changing mechanism is the phase restricting state, and after the operating state of the phase changing mechanism is changed from the phase restricting state to the phase releasing state in response to the output increase requesting operation, the control section executes a torque limiting control for limiting increase in torque of the internal combustion engine.

When the output increase requesting operation is executed by the vehicle driver in the vehicle having the variable valve actuation device, delay in the increase in torque is caused in response to the output increase requesting operation, as described in Problems that the Invention is to Solve.

With regard to the feeling of the vehicle driver at this time, it has been found out that the vehicle driver is less likely to experience the feeling of discomfort in the case where a torque increase rate is low after the torque starts to increase than in the case where the torque increase rate is high after the torque starts to increase, when comparing these cases.

In other words, the degree of the feeling of discomfort experienced by the vehicle driver increases because the degree of change in torque experienced by the vehicle driver is high when, after the output increase requesting operation is executed, the torque does not increase over a predetermined period in response to the operation, and thereafter the torque increases at a relatively high increase rate. On the other hand, the degree of the feeling of discomfort experienced by the vehicle driver reduces because the degree of change in torque experienced by the vehicle driver is lower than the above case when, after the output increase requesting operation is executed, the torque does not increase over the predetermined period in response to the operation, and thereafter the torque increases at a relatively low increase rate.

This aspect of the present invention focuses on this feeling of the vehicle driver, and employs the structure in which the torque limiting control is executed after the output increase requesting operation is executed while the operating state of the phase changing mechanism is in the phase restricting state and after the operating state of the phase changing mechanism is changed from the phase restricting state to the phase releasing state in response to the output increase requesting operation. This makes it possible to reduce the feeling of discomfort experienced by the vehicle driver because, when delay in the increase in torque is caused in the internal combustion engine in response to the output increase requesting operation, the torque increases gently after that.

The present invention further provides a variable valve actuation device for an internal combustion engine. The device includes a phase changing mechanism that changes valve timing of an intake valve and a phase restricting mechanism that restricts the valve timing from being more advanced than a specific phase. An operating state of the phase changing mechanism in which the phase restricting mechanism restricts the valve timing from being advanced is defined as a phase restricting state. An operating state of the phase changing mechanism in which the valve timing is allowed to be more advanced than the specific phase is defined as a phase releasing state. An operation executed by a vehicle driver to increase output of the internal combustion engine is defined as an output increase requesting operation. The variable valve actuation device includes a control section. Based on the execution of the output increase requesting operation while the operating state of the phase changing mechanism is the phase restricting state, the control section executes a phase releasing control for changing the operating state of the phase changing mechanism from the phase restricting state to the phase releasing state, and a torque limiting control for limiting increase in torque of the internal combustion engine.

This aspect of the present invention employs the structure that executes the phase releasing control for changing the operating state of the phase changing mechanism from the phase restricting state to the phase releasing state and the torque limiting control for limiting the increase in torque of the internal combustion engine, based on the output increase requesting operation that is executed while the operating state of the phase changing mechanism is in the phase restricting state. This makes it possible to reduce the feeling of discomfort experienced by the vehicle driver because, when delay in the increase in torque is caused in the internal combustion engine in response to the output increase requesting operation, the torque increases gently after that.

In accordance with one aspect of the present invention, an increase rate of the torque of the internal combustion engine when the torque limiting control is preferably executed is defined as a first torque increase rate. An increase rate of the torque of the internal combustion engine after the output increase requesting operation is executed while the operating state of the phase changing mechanism is the phase releasing state is preferably defined as a second torque increase rate. Further, the control section preferably executes the torque limiting control such that the first torque increase rate is smaller than the second torque increase rate.

This aspect of the present invention employs the structure in which the torque limiting control is executed such that the first torque increase rate is smaller than the second torque increase rate. This makes it possible to reduce the feeling of discomfort experienced by the vehicle driver when delay in the increase in torque is caused in the internal combustion engine, as compared with the structure in which the first torque increase rate is equal to or higher than the second increase rate.

In accordance with one aspect of the present invention, a certain period after the operating state of the phase changing mechanism is changed from the phase restricting state to the phase releasing state is preferably defined as a post-releasing period, and the control section preferably executes the torque limiting control such that an increase rate of the torque of the internal combustion engine in the post-releasing period is less than a predetermined rate.

This aspect of the present invention employs the structure in which the torque limiting control is executed such that the increase rate of the torque of the internal combustion engine in the post-releasing period is less than the predetermined rate. This makes it possible to reduce the feeling of discomfort experienced by the vehicle driver when delay in the increase in torque is caused in the internal combustion engine, as compared with the structure in which the torque increase rate of the internal combustion engine is equal to or higher than the predetermined rate.

In accordance with one aspect of the present invention, an increase rate of the torque of the internal combustion engine during execution of the torque liming control is preferably defined as a limitation-period increase rate. An increase rate of the torque of the internal combustion engine in a case in which the torque liming control is not executed after the operating state of the phase changing mechanism is changed from the phase restricting state to the phase releasing state is preferably defined as a normal-period increase rate, and the control section preferably executes the torque limiting control such that the limitation-period increase rate is less than the normal-period increase rate.

This aspect of the present invention employs the structure in which the torque limiting control is executed such that the limitation-period increase rate is less than the normal-period increase rate. This makes it possible to reduce the feeling of discomfort experienced by the vehicle driver when delay in the increase in torque is caused in the internal combustion engine, as compared with the structure in which the limitation-period increase rate is equal to or higher than the normal-period increase rate.

In accordance with one aspect of the present invention, the torque limiting control preferably includes control for retarding ignition timing.

In accordance with one aspect of the present invention, the control for retarding ignition timing includes: control for setting a retardation correcting amount of the ignition timing after the operating state of the phase changing mechanism is changed from the phase restricting state to the phase releasing state in response to the output increase requesting operation; and control for decreasing the retardation correcting amount in accordance with lapse of time.

According to this aspect of the present invention, the degree of change in torque of the internal combustion engine accompanying the change in ignition timing is lower, as compared with the structure in which the retardation correcting amount of the ignition timing is reduced all at once. This makes it possible to reduce the possibility that the vehicle driver experiences the feeling of discomfort due to a significantly large change in torque of the internal combustion engine.

In accordance with one aspect of the present invention, the torque limiting control preferably includes control for reducing a throttle opening degree, which is an opening degree of a throttle valve of the internal combustion engine.

In accordance with one aspect of the present invention, the control for reducing the throttle opening degree preferably includes: control for setting a reduction correcting amount of the throttle opening degree after the operating state of the phase changing mechanism is changed from the phase restricting state to the phase releasing state in response to the output increase requesting operation; and control for decreasing the reduction correcting amount in accordance with lapse of time.

According to this aspect of the present invention, the degree of change in torque of the internal combustion engine, accompanying the change in throttle opening degree, is lower, as compared with the structure in which the reduction correcting amount of the throttle opening degree is reduced all at once. This makes it possible to reduce the possibility that the vehicle driver experiences the feeling of discomfort due to a significantly large change in torque of the internal combustion engine.

In accordance with one aspect of the present invention, the variable valve actuation device preferably includes a duration changing mechanism that changes the duration of the intake valve, and the torque limiting control preferably includes control for decreasing the duration.

In accordance with one aspect of the present invention, the control for decreasing the duration preferably includes: control for setting a duration decrease correcting amount after the operating state of the phase changing mechanism is changed from the phase restricting state to the phase releasing state in response to the output increase requesting operation; and control for decreasing the duration decrease correcting amount in accordance with lapse of time.

According to this aspect of the present invention, the degree of change in torque of the internal combustion engine, accompanying the change in duration, is lower, as compared with the structure in which the duration decrease correcting amount is reduced all at once. This makes it possible to reduce the possibility that the vehicle driver experiences the feeling of discomfort due to a significantly large change in torque of the internal combustion engine.

BRIEF DESCRIPTION OF THE DRAWINGS

FIG. 6(a) is a table showing relationship between operating states of an oil control valve and supply/drainage states of hydraulic oil to/from the variable valve timing mechanism and a valve timing restricting mechanism;

FIG. 6(b) is a table showing relationship between the operating states of the oil control valve and operating states of the variable valve timing mechanism and the valve timing restricting mechanism, in the variable valve actuation device for an internal combustion engine according to this embodiment;

FIG. 7 is a flowchart showing procedures of phase advancing control executed by an electronic control unit according to this embodiment;

FIG. 9 is a timing chart showing examples of execution modes of phase advancing control executed by the electronic control unit according to this embodiment.

MODES FOR CARRYING OUT THE INVENTION

The present embodiment shows an example of an internal combustion engine including a variable valve actuation device for an internal combustion engine according to the present invention, which is mounted on a vehicle. The vehicle that controls output of the internal combustion engine in response to a pressing-down operation of an accelerator pedal by a vehicle driver is employed.

Figure 1:
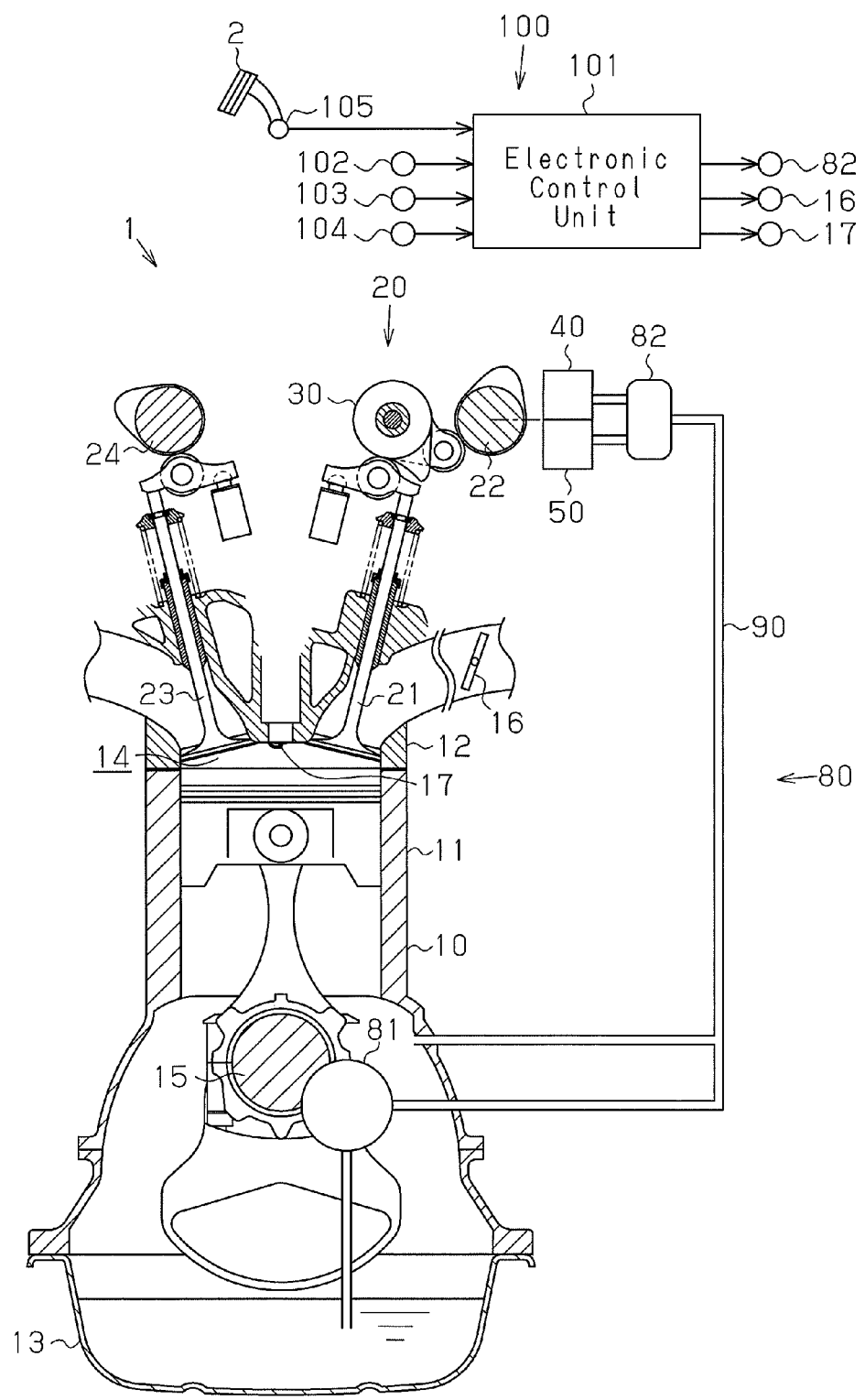
FIG. 1 is a schematic diagram showing the structure of an internal combustion engine including a variable valve actuation device for an internal combustion engine according to one embodiment of the present invention.

The structure of an internal combustion engine 1 will be described with reference to FIG. 1.

The internal combustion engine 1 includes an engine body 10, which rotates a crankshaft 15 by combustion of fuel-air mixture, a variable valve actuation device 20, which includes various elements of a valve actuation system, a hydraulic mechanism 80, which supplies hydraulic oil to the engine body 10 and the like, and a control device 100, which controls various devices including the above-described devices in a centralized manner.

The engine body 10 includes a cylinder block 11, in which combustion of fuel-air mixture is executed, a cylinder head 12, to which the variable valve actuation device 20 is provided, an oil pan 13, which stores hydraulic oil to be supplied to respective elements of the engine body 10, and an ignition plug 17, which ignites the fuel-air mixture.

The variable valve actuation device 20 includes an intake valve 21, which opens and closes an intake port of a combustion chamber 14, an exhaust valve 23, which opens and closes an exhaust port of the combustion chamber 14, an intake cam shaft 22, which presses down the intake valve 21, and an exhaust cam shaft 24, which presses down the exhaust valve 23. In addition, the variable valve actuation device 20 includes a variable valve lift mechanism 30, which changes a maximum valve lift of the intake valve 21 (hereinafter referred to as a maximum valve lift INVL), a variable valve timing mechanism 40, which changes a rotational phase of the intake cam shaft 22 relative to a rotational phase of the crankshaft 15 (hereinafter referred to as a valve timing VT), and a valve timing restricting mechanism 50, which fixes the valve timing VT.

The variable valve lift mechanism 30 changes the maximum valve lift INVL between the maximum valve lift INVL at the upper limit and the maximum valve lift INVL at the lower limit in a continuous manner. Together with the change in maximum valve lift INVL, the duration of the intake valve 21 is changed between the maximum duration and the minimum duration in a continuous manner. The duration of the intake valve 21 corresponds to a rotation angle of the crankshaft 15 during a period from when the intake valve 21 opens until when it closes.

The variable valve timing mechanism 40 changes the valve timing VT between the valve timing at the most advanced position (hereinafter referred to as the most advanced phase VTmax) and the valve timing at the most retarded position (hereinafter referred to as the most retarded phase VTmin).

The valve timing restricting mechanism 50 fixes the valve timing VT at specific valve timing between the most retarded phase VTmin and the most advanced phase VTmax (hereinafter referred to as an intermediate phase VTmdl).

The hydraulic mechanism 80 includes an oil pump 81, which drains hydraulic oil from the oil pan 13, a hydraulic oil path 90, which supplies hydraulic oil drained from the oil pump 81 to the respective elements of the internal combustion engine 1, and an oil control valve 82, which controls a supply mode and a drainage mode of hydraulic oil to/from the variable valve timing mechanism 40 and the valve timing restricting mechanism 50.

The control device 100 includes an electronic control unit 101, which executes various kinds of arithmetic processing and the like for controlling the internal combustion engine 1, and various sensors including a crank position sensor 102, a cam position sensor 103, a throttle position sensor 104, and an accelerator position sensor 105.

The crank position sensor 102 outputs a signal corresponding to a rotation angle of the crankshaft 15 (hereinafter referred to as a crank angle CA) to the electronic control unit 101. The cam position sensor 103 outputs a signal corresponding to a rotation angle of the intake cam shaft 22 (hereinafter referred to as a cam angle DA) to the electronic control unit 101. The throttle position sensor 104 outputs a signal corresponding to an opening degree of a throttle valve 16 (hereinafter referred to as a throttle opening degree VA), which is provided upstream of the intake valve 21 in an intake path to the electronic control unit 101. The accelerator position sensor 105 outputs a signal corresponding to a depression amount of an accelerator pedal 2 (hereinafter referred to as an accelerator depression amount AP) to the electronic control unit 101.

A description will be given of control and the like executed by the electronic control unit 101 as a control section. In the following description, a period from when a starting request of the internal combustion engine 1 is set until when the internal combustion engine 1 shifts to an idle operating state is defined as an engine start-up period. Further, a period from when a stopping request of the internal combustion engine 1 is set until when rotation of the internal combustion engine 1 stops is defined as an engine stopping period. Furthermore, a period when the internal combustion engine 1 is not rotating is defined as a period of engine stoppage. Furthermore, a period when the engine is in an engine operating state between the engine start-up period and the engine stopping period, except for an idle operating period, is defined as a normal engine operating period.

The electronic control unit 101 calculates the following parameters based on output of the respective sensors.

(A) It calculates an arithmetic value corresponding to the crank angle CA based on the output signal of the crank position sensor 102.

(B) It calculates an arithmetic value corresponding to a rotation speed of the crankshaft 15 (hereinafter referred to as an engine rotation speed NE) based on the arithmetic value of the crank angle CA.

(C) It calculates an arithmetic value corresponding to the cam angle DA based on the output signal of the cam position sensor 103.

(D) It calculates an arithmetic value corresponding to the valve timing VT based on the crank angle CA and the cam angle DA.

(E) It calculates an arithmetic value corresponding to the throttle opening degree VA based on the output signal of the throttle position sensor 104.

(F) It calculates an arithmetic value corresponding to the accelerator depression amount AP based on the output signal of the accelerator position sensor 105.

The electronic control unit 101 executes idle rotation speed control to control the engine rotation speed NE during the idle operating period based on a target idle rotation speed, ignition timing control to set the ignition timing of the ignition plug 17 based on the engine operating state, and valve timing control to control the operation of the variable valve timing mechanism 40 and the valve timing restricting mechanism 50 based on the engine operating state.

The valve timing control includes phase advancing control for advancing the valve timing VT during the normal engine operating period, phase retarding control for retarding the valve timing VT during the normal engine operating period, phase maintaining control for maintaining the valve timing VT during the normal engine operating period with hydraulic pressure, and phase restricting control for fixing the valve timing VT by the valve timing restricting mechanism 50.

According to the phase advancing control and the phase retarding control, target valve timing VT (hereinafter referred to as a target phase VTtrg) is set based on the engine operating state, when a request to advance the valve timing VT (hereinafter referred to as a phase advancing request) or a request to retard the valve timing VT (hereinafter referred to as a phase retarding request) is set by the control executed separately.

Then, control of the oil control valve 82 is executed to cause the variable valve timing mechanism 40 to perform a phase advancing operation or a phase retarding operation, based on the target phase VTtrg and the arithmetic value of the valve timing VT.

When the phase advancing request or the phase retarding request is set while the valve timing VT is fixed by the valve timing restricting mechanism 50, the oil control valve 82 is controlled after the fixing of the valve timing VT by the valve timing restricting mechanism 50 is released. The engine rotation speed NE, an engine load, and the like are used as parameters to define the engine operating state.

According to the phase advancing control, a retardation correcting amount of the ignition timing is set when the valve timing VT is advanced in response to the operation of the accelerator pedal 2 from the state where the valve timing VT is fixed by the valve timing restricting mechanism 50. According to the ignition timing control, a command signal of the ignition timing is generated by reflecting the retardation correcting amount that is set by the phase advancing control.

According to the phase maintaining control, the control of the oil control valve 82 is executed to cause the variable valve timing mechanism 40 to execute a maintaining operation, when the valve timing VT is changed to the target phase VTtrg by the phase advancing control or the phase retarding control, or when a request to maintain the valve timing VT as a predetermined phase with the hydraulic pressure (hereinafter referred to as a phase maintaining request) is set by the control executed separately.

According to the phase restricting control, when a request to fix the valve timing VT at the intermediate phase VTmdl (hereinafter referred to as a phase restricting request) is set, the control of the oil control valve 82 is executed to cause the valve timing restricting mechanism 50 to execute a fixing operation. The phase restricting request is set based on engine stop conditions being met, or idle operation conditions being met. The fixing operation means the operation of the valve timing restricting mechanism 50 for fixing the valve timing VT at the intermediate phase VTmdl.

The valve timing VT capable of starting the internal combustion engine 1 even in cold climate areas is set to the intermediate phase VTmdl. When comparing the case where the valve timing VT is maintained at the intermediate phase VTmdl at an engine start-up period with the case where the valve timing VT is maintained at a more retarded position, the former has higher engine startability than the latter.

Figure 2:
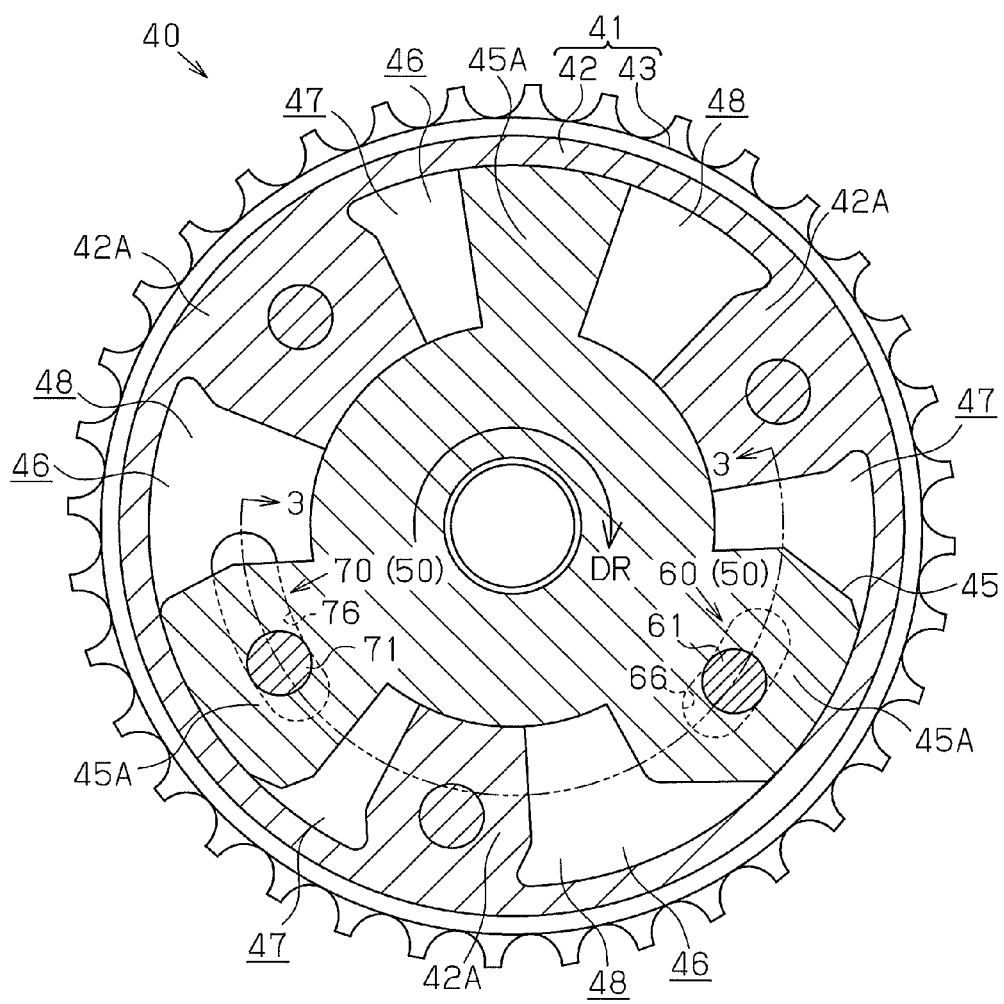
FIG. 2 is a cross-sectional view of a variable valve timing mechanism according to the embodiment, showing a cross-sectional structure along its radial direction.

Structure of the variable valve timing mechanism 40 will be described with reference to FIG. 2.

The variable valve timing mechanism 40 includes a housing rotor 41, which rotates in synchronization with the crankshaft 15, and a vane rotor 45, which rotates in synchronization with the intake cam shaft 22.

The valve timing VT is changed according to the rotational phase of the vane rotor 45 relative to the housing rotor 41. Arrow DR in the drawing shows a rotating direction of a sprocket 43 (crankshaft 15) and the intake cam shaft 22.

Figure 3:
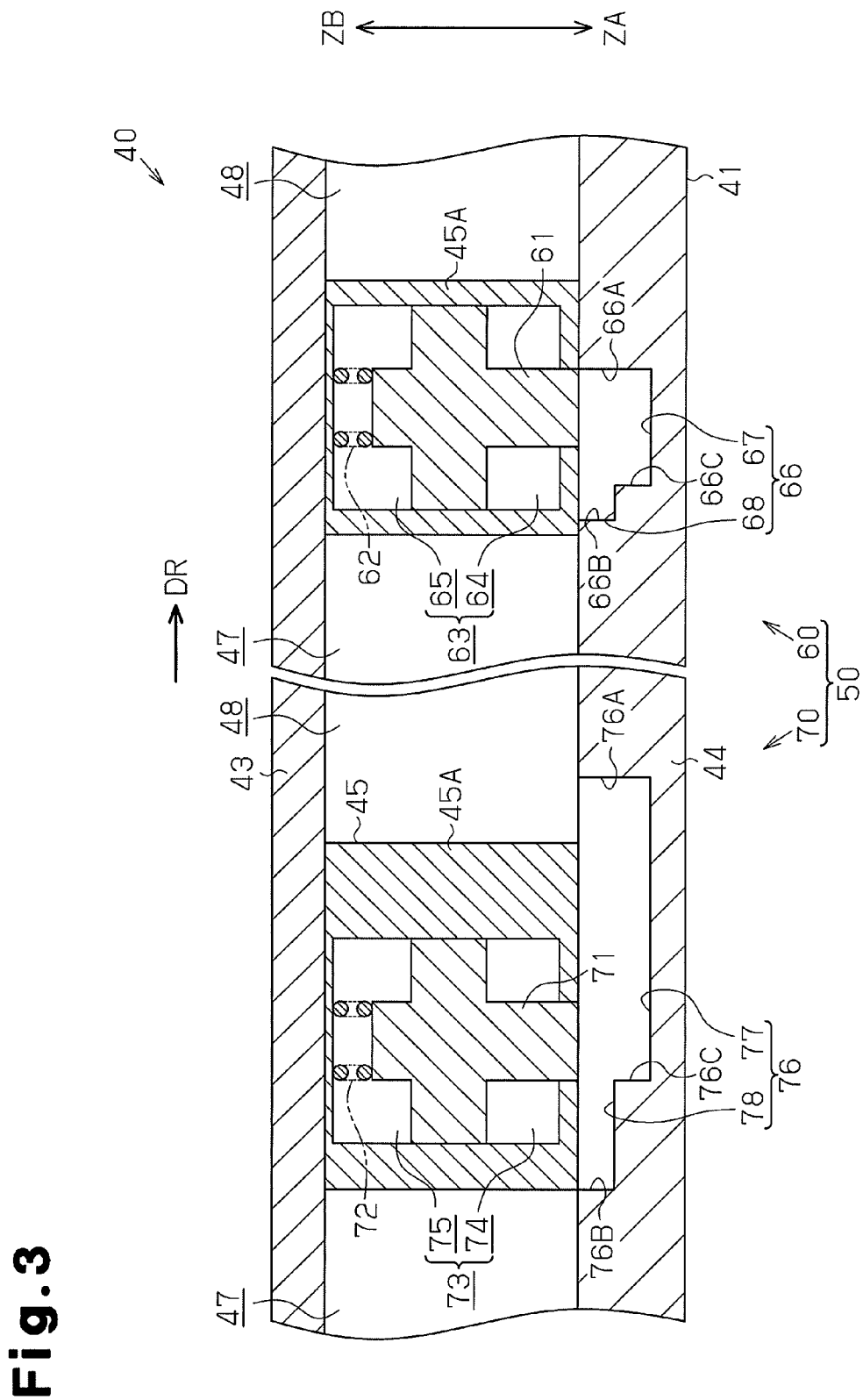
FIG. 3 is a cross-sectional view of the variable valve timing mechanism according to this embodiment, showing a cross-sectional structure that is taken along line 3-3 in FIG. 2 and is developed on a plane.

The housing rotor 41 includes a housing body 42, which serves as its main body, the sprocket 43, which is attached to one end of the housing body 42 in an axial direction, and a cover 44, which is attached to the other end of the housing body 42 in the axial direction (refer to FIG. 3).

The housing body 42 is provided with three partition walls 42A, which protrude in a radial direction of a rotation axis of the housing rotor 41. The housing body 42, the sprocket 43, and the cover 44 are fixed to each other by three bolts that are inserted in the axial direction.

The vane rotor 45 is arranged in the space of the housing body 42, and is fixed to the end of the intake cam shaft 22. The vane rotor 45 is provided with three vanes 45A, which protrude toward the housing body 42.

In the variable valve timing mechanism 40, three accommodating chambers 46 are formed. Each of the accommodating chambers 46 is formed by being surrounded by a wall on an outer periphery of the housing body 42, the adjacent partition wall 42A, a wall around the rotation axis of the vane rotor 45, the sprocket 43, and the cover 44. One of the vanes 45A is arranged in one of the accommodating chambers 46. Each of the accommodating chambers 46 is divided by the corresponding vane 45A into an advance chamber 47 and a retard chamber 48.

The advance chamber 47 is formed at the trailing side of the vane 45A in the accommodating chamber 46 in the rotating direction DR of the intake cam shaft. The retard chamber 48 is formed at the leading side of the vane 45A in the accommodating chamber 46 in the rotating direction DR of the intake cam shaft 22. Capacities of the advance chamber 47 and the retard chamber 48 change according to a supply/drainage state of hydraulic oil to/from the variable valve timing mechanism 40.

The valve timing restricting mechanism 50 includes a first restricting mechanism 60, which restricts a rotation range of the vane rotor 45 relative to the housing rotor 41 to a first range, and a second restricting mechanism 70, which restricts the rotation range of the vane rotor 45 relative to the housing rotor 41 to a second range. The first restricting mechanism 60 and the second restricting mechanism 70 are respectively arranged at the different vanes 45A.

An operation of the variable valve timing mechanism 40 will be described.

When hydraulic oil is supplied to the advance chamber 47 and hydraulic oil is drained from the retard chamber 48, the vane rotor 45 rotates toward the advanced side relative to the housing rotor 41, that is, in the rotating direction DR, and the valve timing VT is advanced. When the vane rotor 45 rotates to the most advanced position relative to the housing rotor 41, that is, when the rotational phase of the vane rotor 45 relative to the housing rotor 41 is at the most leading rotational phase in the rotating direction DR, the valve timing VT is set to the most advanced phase VTmax.

When hydraulic oil is drained from the advance chamber 47 and hydraulic oil is supplied to the retard chamber 48, the vane rotor 45 rotates toward the retarded side relative to the housing rotor 41, that is, toward the opposite direction from the rotating direction DR, and the valve timing VT is retarded. When the vane rotor 45 rotates to the most retarded position relative to the housing rotor 41, that is, when the rotational phase of the vane rotor 45 relative to the housing rotor 41 is at the most trailing rotational phase in the rotating direction DR, the valve timing VT is set to the most retarded phase VTmin.

Figure 4:
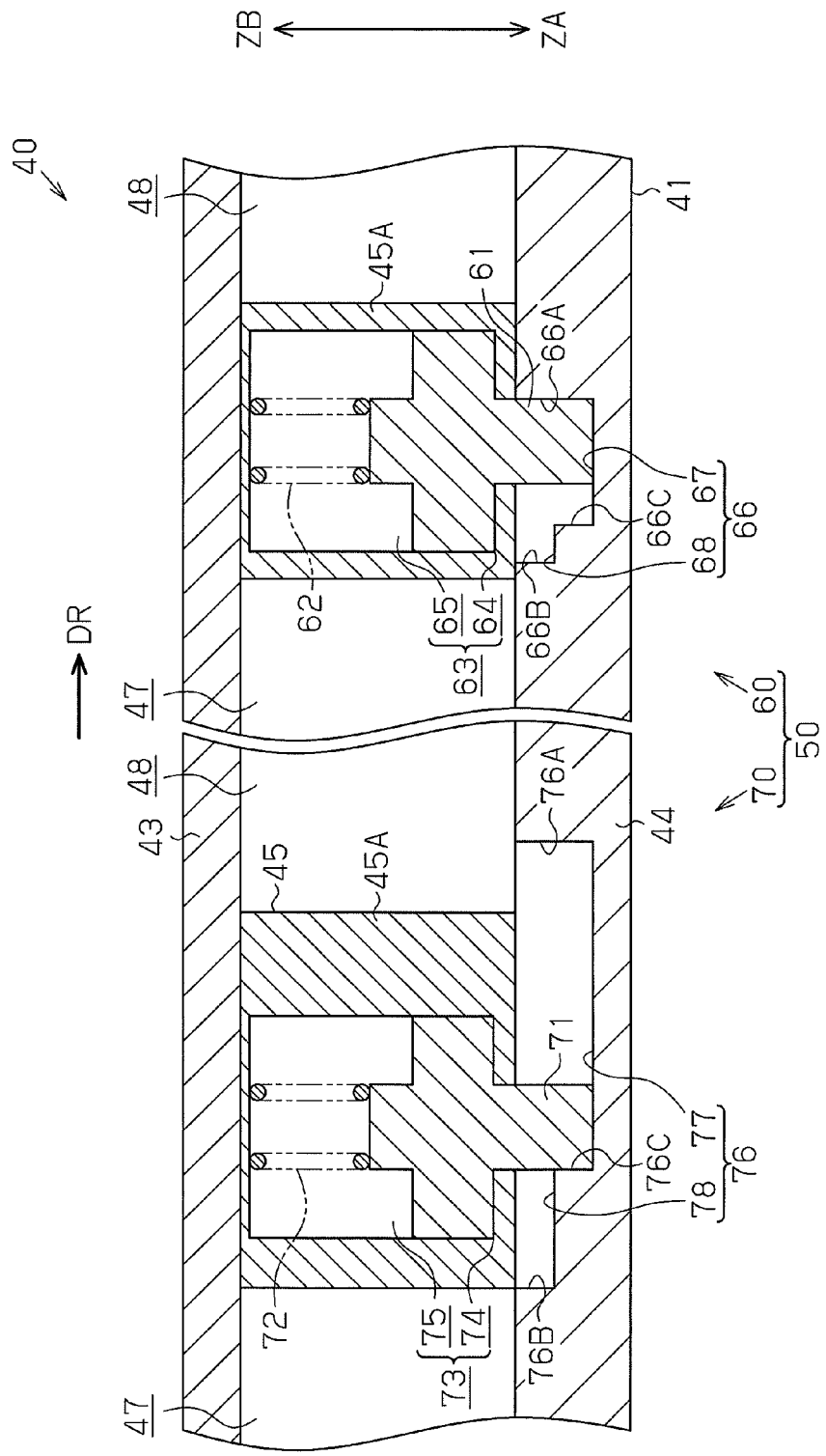
FIG. 4 is a cross-sectional view of the variable valve timing mechanism according to this embodiment, showing a cross-sectional structure that is taken along line 3-3 in FIG. 2 and is developed on a plane.

The structure of the first restricting mechanism 60 and the second restricting mechanism 70 will be described with reference to FIGS. 3 and 4. FIGS. 3 and 4 are diagrams showing the cross-sectional structure of the variable valve timing mechanism 40 that is taken along line 3-3 in FIG. 2 and is developed on a plane.

With regard to the rotational phase of the vane rotor 45 relative to the housing rotor 41, the rotational phase corresponding to the intermediate phase VTmdl is defined as an intermediate rotational phase in the following description. Further, a direction in which a first restricting pin 61 of the first restricting mechanism 60 and a second restricting pin 71 of the second restricting mechanism 70 protrude from the vanes 45A is defined as a protruding direction ZA, and a direction in which the first restricting pin 61 and the second restricting pin 71 are retracted in the vanes 45A is defined as a retracting direction ZB. FIGS. 3 and 4 show operating states of the variable valve timing mechanism 40 at the time when the rotational phase of the vane rotor 45 relative to the housing rotor 41 is in the intermediate rotational phase.

The structure of the first restricting mechanism 60 will be described below.

The first restricting mechanism 60 includes the first restricting pin 61, which moves relative to the vane 45A in an axial direction of the vane rotor 45, and a first restricting spring 62, which presses the first restricting pin 61 in the protruding direction ZA. In addition, the first restricting mechanism 60 includes a first restriction chamber 63, which receives the first restricting pin 61 and the first restricting spring 62, and a first engaging groove 66, which is formed corresponding to a locus of the first restricting pin 61 in a circumferential direction.

The first restriction chamber 63 is formed inside the vane 45A, and is divided by the first restricting pin 61 into a first release chamber 64 and a first spring chamber 65. Supposing that there is no flow of hydraulic oil via a clearance between the respective parts that form the first restricting mechanism 60, the flow of hydraulic oil is not formed between the first release chamber 64 and the first spring chamber 65.

The first engaging groove 66 is formed by two grooves of different depths, that is, a first lower-stage groove 67 having a relatively greater depth, and a first upper-stage groove 68 having a relatively smaller depth. The first upper-stage groove 68 is provided at a more retarded position than the first lower-stage groove 67.

A first advanced end portion 66A as an end at the advanced side of the first lower-stage groove 67 is formed at the position that comes into contact with an end surface at the advanced side of the first restricting pin 61 when the rotational phase of the vane rotor 44 is in the intermediate rotational phase. A first retarded end portion 66B as an end at the retarded side of the first upper-stage groove 68 is formed at a more retarded position than the first advanced end portion 66A. A second retarded end portion 66C as an end at the retarded side of the first lower-stage groove 67 is formed at the position between the first advanced end portion 66A and the first retarded end portion 66B.

The structure of the second restricting mechanism 70 will be described below.

The second restricting mechanism 70 includes the second restricting pin 71, which moves relative to the vane 45A in the axial direction of the vane rotor 45, and a second restricting spring 72, which presses the second restricting pin 71 in the protruding direction ZA. In addition, the second restricting mechanism 70 includes a second restriction chamber 73, which receives the second restricting pin 71 and the second restricting spring 72, and a second engaging groove 76, which is formed corresponding to a locus of the second restricting pin 71 in a circumferential direction.

The second restriction chamber 73 is formed inside the vane 45A, and is divided by the second restricting pin 71 into a second release chamber 74 and a second spring chamber 75. Supposing that there is no flow of hydraulic oil via a clearance between the respective parts that form the second restricting mechanism 70, the flow of hydraulic oil is not formed between the second release chamber 74 and the second spring chamber 75.

The second engaging groove 76 is formed by two grooves of different depths, that is, a second lower-stage groove 77 having a relatively greater depth, and a second upper-stage groove 78 having a relatively smaller depth. The second upper-stage groove 78 is provided at a more retarded position than the second lower-stage groove 77.

A fourth retarded end portion 76C as an end at the retarded side of the second lower-stage groove 77 is formed at the position that comes into contact with an end surface at the retarded side of the second restricting pin 71 when the rotational phase of the vane rotor 44 is in the intermediate rotational phase. A third retarded end portion 76B as an end at the retarded side of the second upper-stage groove 78 is formed at a more retarded position than the fourth retarded end portion 76C. A second advanced end portion 76A as an end at the advanced side of the second lower-stage groove 77 is formed at a more advanced position than the fourth retarded end portion 76C.

Figure 5:
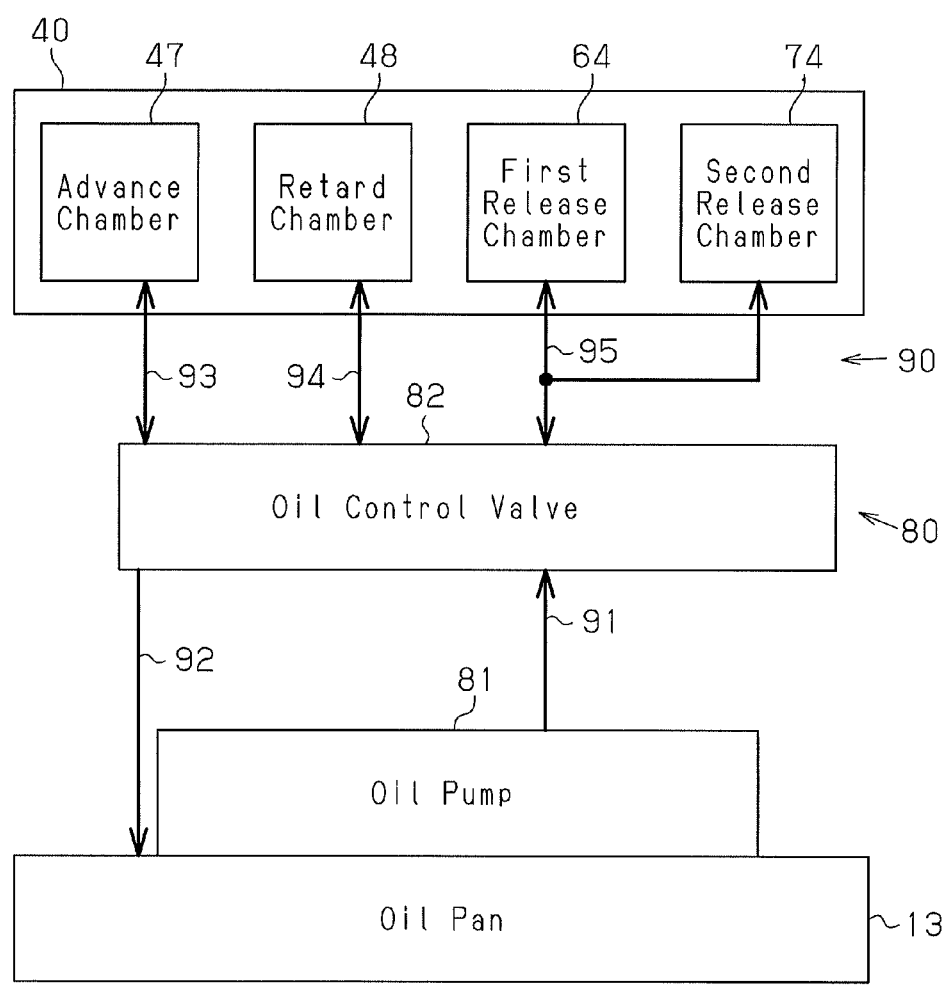
FIG. 5 is a schematic diagram of the variable valve timing mechanism according to this embodiment, showing the structure of a hydraulic system.

Relationship between the variable valve actuation device 20 and the hydraulic mechanism 80 will be described with reference to FIG. 5. FIG. 5 schematically shows the structure of oil paths between the hydraulic mechanism 80, the variable valve timing mechanism 40, and the valve timing restricting mechanism 50.

The hydraulic mechanism 80 includes a supply oil path 91, a drainage oil path 92, a phase advancing oil path 93, a phase retarding oil path 94, and a releasing oil path 95, as the hydraulic oil path 90. The supply oil path 91 connects the oil control valve 82 and the oil pump 81. The drainage oil path 92 connects the oil control valve 82 and the oil pan 13. The phase advancing oil path 93 connects the oil control valve 82 and the advance chamber 47. The phase retarding oil path 94 connects the oil control valve 82 and the retard chamber 48. The releasing oil path 95 connects the oil control valve 82, the first release chamber 64, and the second release chamber 74.

An operation of the valve timing restricting mechanism 50 will be described with reference to FIGS. 3 and 4.

The first restricting pin 61 and the second restricting pin 71 operate within a range from a retracted position shown in FIG. 3 to a protruded position as shown in FIG. 4, according to relationship between force acting on the first restricting pin 61 or the second restricting pin 71 based on the hydraulic pressure of the first release chamber 64 or the second release chamber 74, and spring force of the first restricting spring 62 or the second restricting spring 72.

The protruded position is the position where the first restricting pin 61 or the second restricting pin 71 protrudes from the vane 45A to the maximum extent. Further, the retracted position is the position where a tip of the first restricting pin 61 or the second restricting pin 71 is retracted inside the vane 45A.

The position where the first restricting pin 61 protrudes from the vane 45A to the maximum extent is the position where the tip of the first restricting pin 61 comes into contact with the bottom surface of the first lower-stage groove 67 of the first engaging groove 66. Further, the position where the second restricting pin 71 protrudes from the vane 45A to the maximum extent is the position where the tip of the second restricting pin 71 comes into contact with the bottom surface of the second lower-stage groove 77 of the second engaging groove 76.

Operation modes of the first restricting pin 61 relative to the vane 45A will be specifically described in the following (A) and (B). Since the second restricting pin 71 operates similarly to the modes of the first restricting pin 61, a description on the operation of the second restricting pin 71 will be omitted here.

(A) When the first release chamber 64 is connected to the drainage oil path 92 via the oil control valve 82, hydraulic oil is drained from the first release chamber 64. When the force acting on the first restricting pin 61 based on the hydraulic pressure of the first release chamber 64 is less than the spring force of the first restricting spring 62, force causing the first restricting pin 61 to operate in the protruding direction ZA (hereinafter referred to as protruding force) is continuously given to the first restricting pin 61. When the first restricting pin 61 is at the position corresponding to the first lower-stage groove 67 of the first engaging groove 66, the first restricting pin 61 is at the retracted position relative to the vane 45A, and the protruding force is acting on the first restricting pin 61, the position of the first restricting pin 61 is changed from the retracted position to the protruded position.

(B) When the first release chamber 64 is connected to the supply oil path 91 via the oil control valve 82, hydraulic oil is supplied to the first release chamber 64. When the force acting on the first restricting pin 61 based on the hydraulic pressure of the first release chamber 64 is greater than the spring force of the first restricting spring 62, force causing the first restricting pin 61 to operate in the retracting direction ZB (hereinafter referred to as retracting force) is continuously given to the first restricting pin 61. When the position of the first restricting pin 61 relative to the vane 45A is at the protruded position and the protruding force is acting on the first restricting pin 61, the position of the first restricting pin 61 is changed from the protruded position to the retracted position.

The valve timing restricting mechanism 50 fixes the valve timing VT as follows.

When the first restricting pin 61 is at the protruded position relative to the vane 45A, the rotation of the vane rotor 45 in the advancing direction from the intermediate rotational phase, relative to the housing rotor 41, is restricted. Further, when the second restricting pin 71 is at the protruded position relative to the vane 45A, the rotation of the vane rotor 45 in the retarding direction from the intermediate rotational phase, relative to the housing rotor 41, is restricted.

Thus, when the first restricting pin 61 and the second restricting pin 71 are in the protruded positions, the rotation of the vane rotor 45 in the advancing direction and in the retarding direction from the intermediate rotational phase, relative to the housing rotor 41, is not possible. In other words, the valve timing VT is fixed at the intermediate phase VTmdl as the first restricting pin 61 and the second restricting pin 71 come in contact with the housing rotor 41.

With regard to the operating state of the variable valve timing mechanism 40 and the operating state of the valve timing restricting mechanism 50, the phase releasing state and the phase restricting state are respectively defined as follows.

The operating state of the valve timing restricting mechanism 50 when the first restricting pin 61 and the second restricting pin 71 are at the retracted positions relative to the vanes 45A is defined as the phase releasing state of the valve timing restricting mechanism 50. Further, the operating state of the variable valve timing mechanism 40, with which the valve timing VT can be changed since the operating state of the valve timing restricting mechanism 50 is set to the phase releasing state, is defined as the phase releasing state of the variable valve timing mechanism 40. FIG. 3 shows an example in which the operating states of the variable valve timing mechanism 40 and the valve timing restricting mechanism 50 are in the phase releasing state.

The operating state of the valve timing restricting mechanism 50 when the first restricting pin 61 and the second restricting pin 71 are at the protruded positions, relative to the vanes 45A, is defined as the phase restricting state of the valve timing restricting mechanism 50. Further, the operating state of the variable valve timing mechanism 40, with which the valve timing VT is fixed at the intermediate phase VTmdl since the operating state of the valve timing restricting mechanism 50 is set to the phase restricting state, is defined as the phase restricting state of the variable valve timing mechanism 40. FIG. 4 shows the phase restricting state of the variable valve timing mechanism 40 and the valve timing restricting mechanism 50.

Relationship between the operating states of the variable valve timing mechanism 40 and the valve timing restricting mechanism 50 and the operating state of the oil control valve 82 (hereinafter referred to as a valve operation mode) will be described with reference to FIG. 6. In the following description, flow rates of hydraulic oil and operating speed of the variable valve timing mechanism 40 among the respective valve operation modes are compared on condition that a displacement of the oil pump 81 is assumed to be the same.

FIG. 6(*a*) shows the relationship between the respective valve operation modes and the supply/drainage states of hydraulic oil to/from the advance chamber 47, the retard chamber 48, and the release chambers 64 and 74. FIG. 6(*b*) shows the relationship between the respective valve operation modes and the operating states of the variable valve timing mechanism 40 and the valve timing restricting mechanism 50.

Details of respective items in FIG. 6(*b*) will be described.

(A) Maintaining refers to the state in which the rotation position of the vane rotor 45 relative to the housing rotor 41 is maintained by the hydraulic pressure.

(B) Advancing refers to the state in which the force causing the vane rotor 45 to rotate in the advancing direction relative to the housing rotor 41 is applied to the rotor 45, and the state in which the vane rotor 45 rotates in the advancing direction relative to the housing rotor 41.

(C) Retarding refers to the state in which the force causing the vane rotor 45 to rotate in the advancing direction relative to the housing rotor 41 is applied to the rotor 45, and the state in which the vane rotor 45 rotates in the advancing direction relative to the housing rotor 41.

(D) Protruding refers to the state in which the protruding force is acting on the first restricting pin 61 and the second restricting pin 71, and the state in which the first restricting pin 61 and the second restricting pin 71 are at the protruded positions relative to the vanes 45A.

(E) Retraction refers to the state in which the retracting force is acting on the first restricting pin 61 and the second restricting pin 71, and the state in which the first restricting pin 61 and the second restricting pin 71 are at the retracted positions relative to the vanes 45A.

Details of the respective valve operation modes will be described in the following (A) to (E).

(A) When the valve operation mode is set to a first fixing mode A1, the oil control valve 82 is in the operating state that supplies hydraulic oil to the advance chamber 47, drains hydraulic oil from the retard chamber 48, and drains hydraulic oil from the first release chamber 64 and the second release chamber 74. Thus, the vane rotor 45 rotates in the advancing direction relative to the housing rotor 41. Further, the protruding force acts on the first restricting pin 61 and the second restricting pin 71.

(B) When the valve operation mode is set to a second fixing mode A2, the oil control valve 82 is in the operating state that supplies hydraulic oil, whose amount is smaller than those of the first fixing mode A1 and an advancing mode A3, to the advance chamber 47, drains hydraulic oil from the retard chamber 48, and drains hydraulic oil from the first release chamber 64 and the second release chamber 74. Thus, the vane rotor 45 rotates in the advancing direction relative to the housing rotor 41 at slower speed than that of the first fixing mode A1. Further, the protruding force acts on the first restricting pin 61 and the second restricting pin 71.

(C) When the valve operation mode is set to the advancing mode A3, the oil control valve 82 is in the operating state that supplies hydraulic oil to the advance chamber 47, drains hydraulic oil from the retard chamber 48, and supplies hydraulic oil to the first release chamber 64 and the second release chamber 74. Thus, the vane rotor 45 rotates in the advancing direction relative to the housing rotor 41. Further, the retracting force acts on the first restricting pin 61 and the second restricting pin 71.

(D) When the valve operation mode is set to a maintaining mode A4, the oil control valve 82 is in the operating state that closes the advance chamber 47 and the retard chamber 48, and supplies hydraulic oil to the first release chamber 64 and the second release chamber 74. Thus, the rotation position of the vane rotor 45 relative to the housing rotor 41 is maintained. Further, the retracting force acts on the first restricting pin 61 and the second restricting pin 71.

(E) When the valve operation mode is set to a retarding mode A5, the oil control valve 82 is in the operating state that drains hydraulic oil from the advance chamber 47, supplies hydraulic oil to the retard chamber 48, and supplies hydraulic oil to the first release chamber 64 and the second release chamber 74. Thus, the vane rotor 45 rotates in the advancing direction relative to the housing rotor 41. Further, the retracting force acts on the first restricting pin 61 and the second restricting pin 71.

The electronic control unit 101 controls the oil control valve 82 as the following (A) to (G), in order to control the operations of the variable valve timing mechanism 40 and the valve timing restricting mechanism 50 according to the engine operating states.

(A) Basically, the valve operation mode is selected as follows. Namely, one of the advancing mode A3, the maintaining mode A4, and the retarding mode A5 is selected during the normal engine operating period, according to the engine operating state. Further, the first fixing mode A1 is selected during the engine start-up period. Furthermore, the second fixing mode A2 is selected during the idle operating period. Moreover, the first fixing mode A1 is selected during the engine stopping period.

(B) The valve operation mode is changed from the currently-selected valve operation mode to the first fixing mode A1 or the second fixing mode A2 when the phase restricting request is set during the normal engine operating period and the valve timing VT is in a more retarded phase than the intermediate phase VTmdl. Examples of setting the phase restricting request during the normal engine operating period include the case where the engine stop conditions are met during the normal engine operating period and the case where the idle operation conditions are met during the normal engine operating period.

(C) The valve operation mode is changed from the currently-selected valve operation mode to the retarding mode A5 when the phase restricting request is set during the normal engine operating period and the valve timing VT is in a more advanced phase than the intermediate phase VTmdl. With the valve timing VT retarded from the intermediate phase VTmdl, the valve operation mode is changed to the first fixing mode A1 or the second fixing mode A2.

(D) When the operating state of the variable valve timing mechanism 40 is in the phase restricting state and the phase advancing request or the phase retarding request is set during the engine start-up period or during the idle operating period, the valve operation mode is changed from the first fixing mode A1 or the second fixing mode A2 to the maintaining mode A4. Thereafter, the maintaining mode A4 keeps being selected until the elapsed period from when the mode is changed to the maintaining mode A4 (hereinafter referred to as a release standby period TA) is equal to or longer than a predetermined request standby period TX.

The request standby period TX is the period required for changing the operating state of the valve timing restricting mechanism 50 from the phase restricting state to the phase releasing state, and is set based on results of tests and the like that are carried out in advance. In the following description, a period from when a count of the release standby period TA is started until when the valve operation mode is changed to the advancing mode A3 or the retarding mode A5 is defined as a release standby period. The control for changing the valve operation mode from the first fixing mode A1 or the second fixing mode A2 to the maintaining mode A4 corresponds to phase releasing control.

(E) The valve operation mode is changed from the maintaining mode A4 to the advancing mode A3 when the release standby period TA changes from the period less than the request standby period TX to the period equal to or longer than the request standby period TX and the phase advancing request is set during the release standby period.

(F) The valve operation mode is changed from the maintaining mode A4 to the retarding mode A5 when the release standby period TA changes from the period less than the request standby period TX to the period equal to or longer than the request standby period TX and the phase retarding request is set during the release standby period.

(G) When the operating state of the variable valve timing mechanism 40 is in the phase restricting state and release conditions at the start-up time are not met during the engine start-up period, the change in operating state of the variable valve timing mechanism 40 based on the phase advancing request, the phase retarding request, or the phase maintaining request is inhibited. This control has priority over the control of the above-described (D). The release conditions at the start-up time are set as the conditions to make sure that it is less likely that the valve timing VT becomes unstable even when the operating state of the variable valve timing mechanism 40 is changed to the phase releasing state during the engine start-up period.

A description will be given of advance control of the valve timing VT that is executed by an internal combustion engine as a comparative example (hereinafter referred to as a hypothetical internal combustion engine) with reference to FIG. 9. Solid lines and broken lines in which a long dash alternates with a pair of short dashes in the drawings show changes of the respective parameters according to the internal combustion engine 1 of this embodiment, and lines formed by a long dash alternating with a short dash in the drawings show changes of the respective parameters according to the hypothetical internal combustion engine.

The hypothetical internal combustion engine is different from the internal combustion engine 1 in that processing in step S25 (torque limiting control) is omitted from the phase advancing control (FIG. 7) that is executed by the electronic control unit 101 of this embodiment. For the rest, the hypothetical internal combustion engine has the same structure as that of the internal combustion engine 1.

Supposing that, when the engine operating state of the hypothetical internal combustion engine is in the idle operating state and the valve timing VT is fixed at the intermediate phase VTmdl by the valve timing restricting mechanism 50, the phase advancing request is set in response to the pressing-down operation of the accelerator pedal 2. The flow of a series of control executed by the electronic control unit of the hypothetical internal combustion engine at this time is described below. The pressing-down operation of the accelerator pedal 2 corresponds to an output increase requesting operation.

At a point in time t10, that is, when the accelerator pedal 2 is pressed down, the phase advancing request is set based on this operation. Thereby, the valve operation mode is changed from the second fixing mode A2 to the maintaining mode A4. Further, the count of the release standby period TA is started.

At a point in time t11, that is, when the release standby period TA changes from the period less than the request standby period TX to the period equal to or longer than the request standby period TX, the valve operation mode is changed from the maintaining mode A4 to the advancing mode A3. Thereby, the valve timing VT is advanced from the intermediate phase VTmdl toward the target phase VTtrg. Further, the torque of the internal combustion engine 1 increases corresponding to an advance rate of the valve timing VT.

At a point in time t13, that is, when a predetermined period elapses from when the accelerator pedal 2 is pressed down, the valve timing VT is set to the target phase VTtrg. At this time, the valve operation mode is changed from the advancing mode A3 to the maintaining mode A4. Thereby, the increase in torque corresponding to the advance of the valve timing VT is also stopped.

As described above, when the operating state of the variable valve timing mechanism 40 is in a phase fixing state and the pressing-down operation of the accelerator pedal 2 is executed, the timing when the advance of the valve timing VT starts, that is, the timing when the torque of the hypothetical internal combustion engine starts to increase corresponding to the advance of the valve timing VT is delayed relative to the stepping-down operation of the accelerator pedal 2.

Therefore, the vehicle driver cannot experience the increase in torque of the hypothetical internal combustion engine during a period from when he/she presses down the accelerator pedal 2 until when the advance of the valve timing VT starts. Thereafter, the vehicle driver experiences the increase in torque of the hypothetical internal combustion engine when the predetermined period elapses after he/she presses down the accelerator pedal 2.

With regard to the feeling of the vehicle driver at this time, it has been found out that the vehicle driver is less likely to experience the feeling of discomfort in the case where the torque increase rate is low after the torque starts to increase than in the case where the torque increase rate is high after the torque starts to increase, when comparing these cases.

In other words, the degree of the feeling of discomfort experienced by the vehicle driver increases when, after the pressing-down operation of the accelerator pedal 2, the torque does not increase over a predetermined period in response to the operation, and thereafter increases with a relatively high increase rate. On the other hand, the degree of the feeling of discomfort experienced by the vehicle driver reduces when, after the pressing-down operation of the accelerator pedal 2, the torque does not increase over the predetermined period in response to the operation, and thereafter increases with a relatively low increase rate.

In the phase advancing control according to the internal combustion engine 1 of this embodiment, the torque limiting control that limits the increase in torque of the internal combustion engine 1 is executed, after the pressing-down operation of the accelerator pedal 2 is executed when the operating state of the variable valve timing mechanism 40 is in the phase restricting state, and after the operating state of the variable valve timing mechanism 40 is changed from the phase restricting state to the phase releasing state in response to the pressing-down operation (hereinafter referred to as a post-releasing advancing time). Thereby, even when the increase in torque of the internal combustion engine 1 in response to the pressing-down operation of the accelerator pedal 2 is delayed, the torque increases gently after that, and therefore, the feeling of discomfort experienced by the vehicle driver is reduced.

In this phase advancing control, the increase in torque of the internal combustion engine 1 is limited such that the torque increase rate at the post-releasing advancing time is lower than the torque increase rate of the hypothetical internal combustion engine shown in FIG. 9(*c*), that is, lower than the torque increase rate corresponding to the advance rate of the valve timing VT. Further, as for means for limiting the torque increase rate at the post-releasing advancing time, means for setting the retardation correcting amount that corrects the ignition timing toward the retarded side is employed.

Specific procedures of the phase advancing control will be described with reference to FIG. 7.

This control is repeatedly executed by the electronic control unit 101 for every predetermined control period. Namely, after the processing of the last step is completed, the execution of the control is suspended until the lapse of the predetermined control period. After the lapse of the predetermined control period, valve timing advancing control is executed again from the first step.

In step S11, a determination is made whether it is in the release standby period of the variable valve timing mechanism 40 or not. If the determination result is negative in step S11, that is, when the operating state of the variable valve timing mechanism 40 is in the phase releasing state, or when the operating state of the variable valve timing mechanism 40 is in the phase restricting state and the phase advancing request is not set, the processing moves to step S12. If the determination result is positive in step S11, the processing moves to step S14.

In step S12, a determination is made whether the phase advancing request is set or not. In step S13, a determination is made whether the operating state of the variable valve timing mechanism 40 is set to the phase restricting state or not. Then, processing of any one of the following (A) to (C) is executed based on the determination results of at least one of step S12 and step S13.

(A) If the determination result is negative in step S12, the determination processing of step S11 is executed again after the elapse of the predetermined control period. A typical example of the engine operating state following the flow of step S11, step S12, and step S11 includes the case where the engine operating state without the setting of the phase advancing request is continued during the normal engine operating period.

(B) If the determination result is positive in step S12 and the determination result is negative in step S13, the processing moves to step S23. In step S23, the valve operation mode of the oil control valve 82 is changed from the currently-selected valve operation mode to the advancing mode A3. A typical example of the engine operating state following the flow of steps S11 to S13 and step S23 includes the case where the phase advancing request is set due to an increase in the accelerator depression amount AP during the normal engine operating period.

(C) If the determination result is positive in step S12 and the determination result is positive in step S13, the processing moves to step S21. In step S21, the valve operation mode of the oil control valve 82 is changed from the currently-selected valve operation mode to the maintaining mode A4. In step S22, the count of the elapsed time from when the valve operation mode is changed from the maintaining mode A4 to the advancing mode A3 (hereinafter referred to as a correction reflecting period TB) is started.

In step S14, a determination is made whether the release standby period TA is equal to or longer than the request standby period TX or not. If the determination result is negative in step S14, the determination processing of step S11 and step S14 is executed again after the elapse of the predetermined control period. If the determination result is positive in step S14, the processing moves to step S24.

Figure 8:
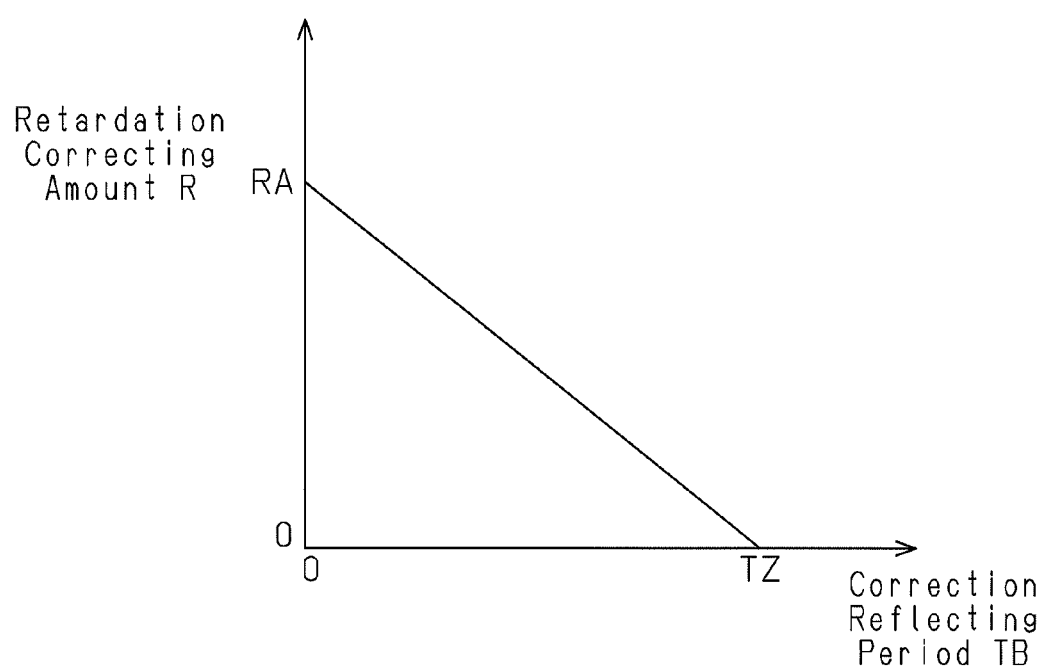
FIG. 8 is a map showing relationship between a retardation correcting amount and a correction reflecting period that is referred in torque limiting control executed by the electronic control unit according to this embodiment.

In step S24, the valve operation mode of the oil control valve 82 is changed from the maintaining mode A4 to the advancing mode A3. In step S25, a retardation correcting amount R of the ignition timing is calculated with reference to a retardation correcting amount map as shown in FIG. 8. A typical example of the engine operating state following the flow of steps S11, S14, S24, and S25 includes the case where the valve timing VT is advanced after the operating state of the variable valve timing mechanism 40 is changed from the phase restricting state to the phase releasing state in response to the pressing-down operation of the accelerator pedal 2.

Specific calculation procedures of the retardation correcting amount R will be described with reference to FIG. 8.

In the retardation correcting amount map, relationship between the correction reflecting period TB and the retardation correcting amount R is defined such that the retardation correcting amount R reduces gradually as the correction reflecting period TB increases. The retardation correcting amount R is set to a start-up time correcting amount RA when the correction reflecting period TB has the minimum value, that is, immediately after the count of the correction reflecting period TB starts. Further, the retardation correcting amount R is set to zero when the correction reflecting period TB is at the reflection termination time TZ.

According to this phase advancing control, the torque increase rate is made lower than the increase rate corresponding to the pressing-down operation of the accelerator pedal 2 by the torque limiting control. Therefore, responsiveness to an accelerating request from the vehicle driver is reduced as compared with the case where the torque limiting control is not executed. It is preferable, from the viewpoint of responding to the accelerating request from the vehicle driver, to set a reduction rate of the retardation correcting amount R as high as possible.

Meanwhile, it is necessary to set the reduction rate of the retardation correcting amount R while considering the original objective of the torque limiting control, which is to limit the feeling of discomfort experienced by the vehicle driver due to an increase in torque at the post-releasing advancing time.

For this reason, this phase advancing control uses the retardation correcting amount map, in which the relationship between the correction reflecting period TB and the retardation correcting amount R is set based on the above-described two viewpoints. This makes it possible to obtain the effect of limiting the feeling of discomfort experienced by the vehicle driver due to an increase in torque at the post-releasing advancing time, and the effect of limiting excessive deterioration in the responsiveness to the accelerating request from the vehicle driver.

An example of an execution mode of the phase advancing control will be described with reference to FIG. 9.

Now, the following cases A and B will be described as example cases where the valve timing VT is changed by the phase advancing control.

Case A: the case where the phase advancing request is set by pressing down the accelerator pedal 2 when the operating state of the variable valve timing mechanism 40 is in the phase restricting state (solid lines in the drawings).

Case B: the case where the phase advancing request is set by pressing down the accelerator pedal 2 when the valve timing VT is maintained at the intermediate phase VTmdl by the hydraulic pressure (broken lines in which a long dash alternates with a pair of short dashes in the drawings).

The flow of the phase advancing control in the case A will be described below.

At the point in time t10, that is, when the accelerator pedal 2 is pressed down, the phase advancing request is set based on this operation. Thereby, the valve operation mode is changed from the second fixing mode A2 to the maintaining mode A4. Further, the count of the release standby period TA is started.

At the point in time t11, that is, when the release standby period TA changes from the period less than the request standby period TX to the period equal to or longer than the request standby period TX, the valve operation mode is changed from the maintaining mode A4 to the advancing mode A3. Thereby, the valve timing VT is advanced from the intermediate phase VTmdl toward the target phase VTtrg.

Further, at the point in time t11, the start-up time correcting amount RA is set as the retardation correcting amount R of the ignition timing. Thereby, the torque increase rate at the post-releasing advancing time becomes lower than the torque increase rate of the hypothetical internal combustion engine (a line formed by a long dash alternating with a short dash), that is, lower than the torque increase rate corresponding to the advance rate of the valve timing VT.

The solid line in FIG. 9(*c*) shows a torque change tendency on condition that various factors affecting the torque of the internal combustion engine 1, except for the valve timing VT and the retardation correcting amount R of the ignition timing, are maintained constant. Further, the a line formed by a long dash alternating with a short dash and the a broken line in which a long dash alternates with a pair of short dashes in FIG. 9(*c*) show the torque change tendencies on condition that the various factors affecting the torque of the internal combustion engine 1, except for the valve timing VT, are maintained constant. The torque increase rate of the hypothetical internal combustion engine at the post-releasing advancing time corresponds to a torque increase rate under normal conditions. Further, the torque increase rate of the case A at the post-releasing advancing time corresponds to a first torque increase rate and a limitation-period increase rate. Furthermore, the torque increase rate of the case B at the post-releasing advancing time corresponds to a second torque increase rate.

At the point in time t13, that is, when the predetermined period elapses from when the accelerator pedal 2 is pressed down, the valve timing VT is set to the target phase VTtrg. At this time, the valve operation mode is changed from the advancing mode A3 to the maintaining mode A4. In the hypothetical internal combustion engine, the torque increases according to the advance rate of the valve timing VT, and hence the increase in torque stops at the point in time t13 when the advance of the valve timing VT stops. On the other hand, in the internal combustion engine 1, the retardation correcting amount R of the ignition timing is being reduced toward zero, that is, the ignition timing is being advanced. This causes the torque to increase during the period from the point in time t13 to a point in time t14.

At the point in time t14, that is, when the correction reflecting period TB reaches the reflection termination time TZ, the retardation correcting amount R of the ignition timing is set to zero. In other words, the retardation correction of the ignition timing based on the torque limiting control of the phase advancing control is stopped.

The flow of the phase advancing control in the case B will be described below.

At the point in time t10, that is, when the accelerator pedal 2 is pressed down, the phase advancing request is set based on this operation. Thus, the valve operation mode is changed from the maintaining mode A4 to the advancing mode A3. Thereby, the valve timing VT is advanced from the intermediate phase VTmdl toward the target phase VTtrg. In the case B, the torque increase rate at the advancing time after the accelerator pedal 2 is pressed down is higher than the torque increase rate at the post-releasing advancing time in the case A (solid line).

At a point in time t12, that is, when a predetermined period elapses after the accelerator pedal 2 is pressed down, the valve timing VT is set at the target phase VTtrg. At this time, the valve operation mode is changed from the advancing mode A3 to the maintaining mode A4.

Advantages of Embodiment

The following advantages are obtained by the internal combustion engine 1 of this embodiment.

(1) In the phase advancing control of the internal combustion engine 1, the torque limiting control is executed after the phase advancing request is set by pressing down the accelerator pedal 2 while the operating state of the variable valve timing mechanism 40 is in the phase restricting state.

According to this structure, when delay in the increase in torque of the internal combustion engine 1 is caused in response to the pressing-down operation of the accelerator pedal 2, the torque increases gently after that. This makes it possible to reduce the feeling of discomfort experienced by the vehicle driver.

(2) In the torque limiting control of the internal combustion engine 1, the torque increase rate at the post-releasing advancing time is made lower than the torque increase rate corresponding to the advance rate of the valve timing VT by setting the retardation correcting amount R of the ignition timing.

According to this structure, it is possible to reduce the feeling of discomfort experienced by the vehicle driver in a more appropriate manner when increase in torque of the internal combustion engine 1 is delayed, as compared with the structure in which the torque increase rate at the post-releasing advancing time corresponds to the advance rate of the valve timing VT.

(3) In the torque limiting control of the internal combustion engine 1, the retardation correcting amount R of the ignition timing is set after the operating state of the variable valve timing mechanism 40 is changed from the phase restricting state to the phase releasing state, in response to the pressing-down operation of the accelerator pedal 2, and the retardation correcting amount R is reduced as the correction reflecting period TB becomes longer.

According to this structure, the degree of change in torque of the internal combustion engine 1 accompanying a change in the ignition timing is reduced as compared with the structure in which the retardation correcting amount R is changed to zero all at once during the execution of the torque limiting control. For this reason, it is possible to reduce the possibility that the vehicle driver experiences the feeling of discomfort due to a significantly large change in torque of the internal combustion engine 1.

(4) It is possible to select the advancing mode A3 as the valve operation mode of the oil control valve 82, in order to change the operating state of the valve timing restricting mechanism 50 from the phase restricting state to the phase releasing state. In this case, however, the first restricting pin 61 is pressed against the first advanced end portion 66A of the first engaging groove 66, which may increase the period during which the first restricting pin 61 shifts from the protruded position to the retracted position. In other words, the period required to change the operating state of the variable valve timing mechanism 40 from the phase restricting state to the phase releasing state may become longer. In addition, an excessive stress may be caused in the first restricting pin 61 because the first restricting pin 61 is pressed against the first advanced end portion 66A.

Therefore, in the internal combustion engine 1, the maintaining mode A4 is selected as the valve operation mode of the oil control valve 82 when the pressing-down operation of the accelerator pedal 2 is executed while the operating state of the variable valve timing mechanism 40 is in the phase restricting state, and the maintaining mode A4 is changed to the advancing mode A3 when the release standby period TA is equal to or longer than the request standby period TX. This makes it possible to obtain the effect of reducing the period required for changing the operating state of the variable valve timing mechanism 40 from the phase restricting state to the phase releasing state, and the effect of limiting the generation of the excessive stress in the first restricting pin 61. In the following description, these effects are collectively referred to as a maintaining selection effect.

As the request standby period TX, the period is used that is required for changing the operating state of the valve timing restricting mechanism 50 from the phase restricting state to the phase releasing state, and that is set in advance.

Namely, the above-described control for changing the maintaining mode A4 to the advancing mode A3 when the release standby period TA is equal to or longer than the request standby period TX can be described as the control that selects the advancing mode A3 by assuming that the operating state of the valve timing restricting mechanism 50 has already been changed to the phase releasing state when the release standby period TA is within the range of engine operation conditions set in advance when setting the request standby period TX and is equal to or longer than the request standby period TX.

Even if the operating state of the valve timing restricting mechanism 50 is not actually changed to the phase releasing state when the release standby period TA is equal to or longer than the request standby period TX during the execution of the phase advancing control, hydraulic oil is drained from the first release chamber 64 and the second release chamber 74 by selecting the advancing mode A3. This makes it possible to achieve a desired objective, which is to change the operating state of the valve timing restricting mechanism 50 to the phase releasing state and to advance the valve timing VT after that.

Meanwhile, the period required for changing the operating state of the valve timing restricting mechanism 50 from the phase restricting state to the phase releasing state changes according to the temperature of hydraulic oil, the engine rotation speed, and the like. For this reason, when adjusting the request standby period TX, it is necessary to take into account variations in the period required for changing the operating state of the variable valve timing mechanism 40 from the phase restricting state and the phase releasing state.

With regard to the extent to which the operating state of the valve timing restricting mechanism 50 is not changed to the phase releasing state when the release standby period TA is equal to or longer than the request standby period TX, the request standby period TX becomes longer in the case where the request standby period TX is adjusted such that the above extent becomes smaller than a predetermined extent (adjustment mode 1) than in the case where the request standby period TX is adjusted to permit that the extent becomes larger than the predetermined extent (adjustment mode 2).

Meanwhile, with regard to the increase in torque after the pressing-down operation of the accelerator pedal 2 is executed while the operating state of the variable valve timing mechanism 40 is in the phase restricting state, the degree of the feeling of discomfort experienced accordingly by the vehicle driver tends to increase as the delay in the advance of the valve timing VT relative to the pressing-down operation of the accelerator pedal 2 increases.

Therefore, when comparing the case where the request standby period TX is set to a relatively short period with the case where the request standby period TX is set to a relatively long period, the feeling of discomfort experienced by the vehicle driver at the post-releasing advancing time is greater in the latter case than in the former case.

Since the phase advancing control employs the request standby period TX adjusted through the adjustment mode 1, the period from when the phase advancing request is set in response to the pressing-down operation of the accelerator pedal 2 until when the advance of the valve timing VT is started becomes longer than the case where the request standby period TX adjusted through the adjustment mode 2 is employed.

As described thus far, although the internal combustion engine 1 can obtain the above-described maintaining selection effect, it is potentially likely that the feeling of discomfort experienced by the vehicle driver at the post-releasing advancing time increases further. Even when the request standby period TX adjusted through the adjustment mode 2 is employed, advance of the valve timing VT is delayed relative to the pressing-down operation of the accelerator pedal 2, and there is also the possibility that the vehicle driver experiences the feeling of discomfort at the post-releasing advancing time.

However, since the torque limiting control is executed in the internal combustion engine 1, the feeling of discomfort experienced by the vehicle driver at the post-releasing advancing time is reduced, as described in the above (1). In other words, it is possible for the internal combustion engine 1 to obtain both of the maintaining selection effect and the effect of reducing the feeling of discomfort experienced by the vehicle driver at the post-releasing advancing time.

(5) The internal combustion engine 1 employs the valve timing restricting mechanism 50, which fixes the valve timing VT at the intermediate phase VTmdl by the first restricting mechanism 60 and the second restricting mechanism 70, which work together. Meanwhile, some phase restricting mechanisms may fix the valve timing VT at a specific phase, such as the intermediate phase VTmdl, by inserting one restricting pin into a hole corresponding to the pin (hereinafter referred to as a single restricting mechanism).

Since the single restricting mechanism is structured to insert the restricting pin into the hole corresponding to the pin, there is the high possibility that the restricting pin is not inserted into the hole when the rotation speed of the vane rotor 45 relative to the housing rotor 41 is high.

In order to reduce the possibility, such a structure is employed in which the engaging groove connected to the hole is formed in the housing rotor 41. However, only one stage of the engaging groove can generally be formed, due to limitations such as the size of the variable valve timing mechanism 40 and the like.

Therefore, when the valve timing VT is fixed at the intermediate phase VTmdl from the state where the valve timing VT is at a more retarded position than the intermediate phase VTmdl, relative rotation of the vane rotor 45 is restricted by the restricting pin through the following two steps. That is, the relative rotation of the vane rotor 45 is restricted through the first step, in which the restricting pin protrudes inside the engaging groove, and the second step, in which the restricting pin protrudes inside the hole.

In contrast, when the valve timing VT is fixed at the intermediate phase VTmdl from the state where the valve timing VT is at a more retarded position than the intermediate phase VTmdl, according to the valve timing restricting mechanism 50, the relative rotation of the vane rotor 45 is restricted by the first restricting pin 61 and the second restricting pin 71 through the following four steps. That is, the relative rotation of the vane rotor 45 is restricted through the first step, in which the second restricting pin 71 protrudes inside the second upper-stage groove 78, the second step, in which the first restricting pin 61 protrudes inside the first upper-stage groove 68, the third step, in which the first restricting pin 61 protrudes inside the first lower-stage groove 67, and the fourth step, in which the second restricting pin 71 protrudes inside the second lower-stage groove 77.

Thus, in the process until the rotation of the vane rotor 45 is restricted, the amount by which the vane rotor 45 is returned back to the retarded side is reduced as compared with the single restricting mechanism. In other words, the amount by which the vane rotor 45 swings to the housing rotor 41 is reduced. In the following description, the effect that can be obtained by the comparison with the single restricting mechanism is referred to as a restricting pin effect.

On the other hand, according to the valve timing restricting mechanism 50, it is necessary to set the request standby period TX by considering the period in which the both of the first restricting pin 61 of the first restricting mechanism 60 and the second restricting pin 71 of the second restricting mechanism 70 shift from the protruded positions to the retracted positions. Namely, when the period in which the first restricting pin 61 of the first restricting mechanism 60 shifts from the protruded position to the retracted position (hereinafter referred to as a first moving period) is different from the period in which the second restricting pin 71 of the second restricting mechanism 70 shifts from the protruded position to the retracted position (hereinafter referred to as a second moving period), it is necessary to set the request standby period TX based on the longer period out of the first moving period and the second moving period, in order to obtain the maintaining selection effect described in the above (4) with more reliability.

Since the request standby period TX is adjusted based on the longer period out of the first moving period and the second moving period according to the phase advancing control, it is potentially likely that the feeling of discomfort experienced by the vehicle driver at the post-releasing advancing time increases further. Even when the request standby period TX is adjusted based on the shorter period out of the first moving period and the second moving period, delay is caused in the advance of the valve timing VT relative to the pressing-down operation of the accelerator pedal 2, which may also cause the possibility that the vehicle driver experiences the feeling of discomfort at the post-releasing advancing time.

However, since the torque limiting control is executed in the internal combustion engine 1, the feeling of discomfort experienced by the vehicle driver at the post-releasing advancing time is reduced, as described in the above (1). In other words, it is possible for the internal combustion engine 1 to obtain both of the restricting pin effect and the effect of reducing the feeling of discomfort experienced by the vehicle driver at the post-releasing advancing time.

(6) According to the internal combustion engine 1, the valve timing VT is fixed at the intermediate phase VTmdl by the valve timing restricting mechanism 50 when the engine 1 is in the idle operating state. Therefore, it is highly likely that next engine start-up is executed while the valve timing VT is fixed at the intermediate phase VTmdl. For this reason, it is likely that the engine startup is executed with high engine startability.

Meanwhile, the phase restricting mechanism that fixes the valve timing VT at the most retarded phase VTmin is known. However, according to the internal combustion engine including this phase restricting mechanism, the control for fixing the valve timing VT during the idle operating period by the phase restricting mechanism is not executed in general.

Therefore, as compared with the internal combustion engine including the above-described phase restricting mechanism, it is highly likely that the operating state of the variable valve timing mechanism 40 is set to the phase restricting state, according to the internal combustion engine 1 having the valve timing restricting mechanism 50. This means that it is highly likely that the pressing-down operation of the accelerator pedal 2 is executed when the operating state of the variable valve timing mechanism 40 is in the phase restricting state. That is, it is potentially likely that the vehicle driver experiences the feeling of discomfort accompanying the increase in torque at the post-releasing advancing time.

However, since the torque limiting control is executed in the internal combustion engine 1, the feeling of discomfort experienced by the vehicle driver at the post-releasing advancing time is reduced as described in the above (1). In other words, it is possible for the internal combustion engine 1 to obtain both of the effect of reducing the feeling of discomfort experienced by the vehicle driver at the post-releasing advancing time and the effect of increasing the frequency at which the next engine startup is executed while the valve timing VT is fixed at the intermediate phase VTmdl.

By the torque limiting control, the internal combustion engine 1 can limit the feeling of discomfort that is caused at higher frequency in the structure employing the valve timing restricting mechanism 50 maintaining the valve timing VT at the intermediate phase VTmdl, as compared with the internal combustion engine having as the phase restricting mechanism the variable valve timing mechanism maintaining the valve timing VT at the most retarded phase.

Other Embodiments

The present invention is not limited to the above embodiment and, for example, can be modified as follows. Each of following modified examples is not only applied exclusively to the above embodiment but also allowed to be executed in combination with another modified example.

In the above-described embodiment (FIG. 7), means for setting the retardation correcting amount R of the ignition timing is employed as means for limiting the increase in torque in the torque limiting control. Instead of this means, however, it is possible to employ any one of (A) to (E) below. The internal combustion engine 1 of the above-described embodiment uses the variable valve lift mechanism 30, which changes the maximum valve lift and the duration of the intake valve 21 in synchronization with each other. Therefore, when the control of one of (B) and (C) below is executed, the control of the other is also substantially executed.

(A) The increase in torque is limited by reducing the throttle opening degree VA. The following is an example of the specific control mode in this case. Namely, a reduction correcting amount of the throttle opening degree VA is set after the operating state of the variable valve timing mechanism 40 is changed from the phase restricting state to the phase releasing state in response to the pressing-down operation of the accelerator pedal 2, and the reduction correcting amount is reduced as the correction reflecting period TB elapses. As the reduction correcting amount, a correcting amount representing an absolute amount of the throttle opening degree VA or a correcting amount representing a ratio to the throttle opening degree VA at the start of the torque limiting control may be set.

(B) The increase in torque is limited by reducing the duration of the intake valve 21. The following is an example of the specific control mode in this case. Namely, a reduction correcting amount of a valve duration is set after the operating state of the variable valve timing mechanism 40 is changed from the phase restricting state to the phase releasing state in response to the pressing-down operation of the accelerator pedal 2, and the reduction correcting amount is reduced as the correction reflecting period TB elapses. As the reduction correcting amount, a correcting amount representing an absolute amount of the duration of the intake valve 21 or a correcting amount representing a ratio to the duration of the intake valve 21 at the start of the torque limiting control may be set.

(C) The increase in torque is limited by reducing the maximum valve lift INVL. The following is an example of the specific control mode in this case. Namely, a reduction correcting amount of the maximum valve lift INVL is set after the operating state of the variable valve timing mechanism 40 is changed from the phase restricting state to the phase releasing state in response to the pressing-down operation of the accelerator pedal 2, and the reduction correcting amount is reduced as the correction reflecting period TB elapses. As the reduction correcting amount, a correcting amount representing an absolute amount of the maximum valve lift INVL or a correcting amount representing a ratio to the maximum valve lift INVL at the start of the torque limiting control may be set.

(D) The increase in torque is limited by reducing the fuel injection amount of the injector. The following is an example of the specific control mode in this case. Namely, a reduction correcting amount of the fuel injection amount is set after the operating state of the variable valve timing mechanism 40 is changed from the phase restricting state to the phase releasing state in response to the pressing-down operation of the accelerator pedal 2, and the reduction correcting amount is reduced as the correction reflecting period TB elapses. As the reduction correcting amount, a correcting amount representing an absolute amount of the fuel injection amount or a correcting amount representing a ratio to the fuel injection amount at the start of the torque limiting control may be set.

(E) The increase in torque is limited by reducing an advance rate of the valve timing VT. Namely, the increase in torque is limited by reducing the advance rate at the post-releasing advancing time to be smaller than the advance rate corresponding to the pressing-down operation of the accelerator pedal 2, or the advance rate that is set as a reference advance rate in the phase advancing control. The following is an example of the specific control mode in this case. Namely, a reduction correcting amount of the advance rate is set after the operating state of the variable valve timing mechanism 40 is changed from the phase restricting state to the phase releasing state in response to the pressing-down operation of the accelerator pedal 2, and the reduction correcting amount is reduced as the correction reflecting period TB elapses. As the reduction correcting amount, a correcting amount representing an absolute amount of the advance rate, or a correcting amount representing a ratio to the advance rate at the start of the torque limiting control may be set.

In the phase advancing control (FIG. 7) of the above-described embodiment, the advance control of the valve timing VT that is assumed to be executed by the hypothetical internal combustion engine may be employed. That is, the torque limiting control need not be executed at the post-releasing advancing time. The following is an example of the specific control mode in this case.

In the phase advancing control, a step for determining whether execution conditions of the torque limiting control are met or not may be added between step S24 and step S25. The execution conditions include, for example, whether the depression amount AP of the accelerator pedal 2 is less than a predetermined depression amount or not.

When the depression amount AP is less than the predetermined depression amount, the torque increase rate accompanying the advance of the valve timing VT is low. It is therefore less likely that the vehicle driver experiences the feeling of discomfort in response to the increase in torque at the post-releasing advancing time.

Therefore, it is also possible to appropriately reduce the feeling of discomfort experienced by the vehicle driver at the post-releasing advancing time when such a structure is employed in which the execution of the torque limiting control is omitted in the case where the depression amount AP is less than the predetermined depression amount, and the torque limiting control is executed in the case where the depression amount AP is equal to or greater than the predetermined depression amount. When the execution of the torque limiting control is omitted, the torque increase rate at the post-releasing advancing time can be maintained to correspond to the output increase request of the vehicle driver. The torque increase rate when the torque limiting control is executed corresponds to the limitation-period increase rate.

Further, the torque increase rate when the torque limiting control is omitted corresponds to a normal-period increase rate.

In the above-described embodiment (FIG. 8), the retardation correcting amount R is gradually reduced as the correction reflecting period TB increases in the torque limiting control. However, the control mode of the retardation correcting amount R can be changed to one of (A) to (D) below.

(A) When the correction reflecting period TB is less than a predetermined period, the retardation correcting amount R may be maintained constant. Further, when the correction reflecting period TB is equal to or longer than the predetermined period, the retardation correcting amount R is set to zero. The predetermined period may be set to a period that is equal to or shorter than the reflection termination time TZ, for example.

(B) When the correction reflecting period TB is less than the predetermined period, the retardation correcting amount R may be reduced at a first reduction rate. Further, when the correction reflecting period TB is equal to or longer than the predetermined period, the retardation correcting amount R is reduced at a second reduction rate. In this case, it is possible to improve the effect of reducing the feeling of discomfort experienced by the vehicle driver when the first reduction rate is set to be lower than the second reduction rate. Further, the first reduction rate and the second reduction rate may be set such that the retardation correcting amount R becomes zero when the valve timing VT reaches the target phase VTtrg in the post-releasing advancing time or before the valve timing VT reaches the target phase VTtrg. The predetermined period may be set to a period that is shorter than the reflection termination time TZ, for example.

(C) The retardation correcting amount R may be reduced based on the torque increase rate, instead of the correction reflecting period TB. In this case, the reduction rate of the retardation correcting amount R can be changed as long as the torque increase rate is lower than the predetermined rate.

(D) The retardation correcting amount R may be reduced based on the advance amount of the valve timing VT after the torque limiting control is started, instead of the correction reflecting period TB. In this case, the reduction rate of the retardation correcting amount R can be changed as long as the torque increase rate accompanying the advance of the valve timing VT is lower than the predetermined increase rate.

In the above-described embodiment (FIG. 7), the valve operation mode is changed from the maintaining mode A4 to the advancing mode A3 when the release standby period TA changes from the period less than the request standby period TX to the period equal to or longer than the request standby period TX. However, the condition for changing the valve operation mode from the maintaining mode A4 to the advancing mode A3 may be changed as follows.

Namely, a determination is made whether phase release conditions are met that indicate that the operating state of the variable valve timing mechanism 40 is changed from the phase restricting state to the phase releasing state. When it is determined that the phase release conditions are met, the valve operation mode is changed from the maintaining mode A4 to the advancing mode A3.

According to the above-described embodiment (FIG. 7), the valve operation mode is set to the maintaining mode A4 to change the phase restricting state to the phase releasing state, when the operating state of the variable valve timing mechanism 40 is in the phase restricting state and the phase advancing request is set based on the pressing-down operation of the accelerator pedal 2. However, the valve operation mode may be set to the advancing mode A3, instead of the maintaining mode A4.

According to the above-described embodiment (FIG. 6), the valve operation mode is set to the maintaining mode A4 to change the phase restricting state to the phase releasing state when the operating state of the variable valve timing mechanism 40 is in the phase restricting state and the phase retarding request is set based on the engine operating state. However, the valve operation mode may be set to the retarding mode A5, instead of the maintaining mode A4.

According to the above-described embodiment (FIG. 6), the oil control valve 82 having the five valve operation modes is employed, but other valve operation modes may be further added to the modes of the valve 82. Other valve operation modes may include, for example, a third fixing mode B1, a fourth fixing mode B2, and a fifth fixing mode B3 as described below.

(A) According to the third fixing mode B1, hydraulic oil is drained from the advance chamber 47, hydraulic oil is supplied to the retard chamber 48, and hydraulic oil is drained from the first release chamber 64 and the second release chamber 74.

(B) According to the fourth fixing mode B2, hydraulic oil is drained from the advance chamber 47, hydraulic oil the amount of which is smaller than that of the third fixing mode B1 is supplied to the retard chamber 48, and hydraulic oil is drained from the first release chamber 64 and the second release chamber 74.

(C) According to the fifth fixing mode B3, hydraulic oil is supplied to the advance chamber 47 and the retard chamber 48, and hydraulic oil is drained from the first release chamber 64 and the second release chamber 74.

The above-described embodiment (FIG. 6) has the first fixing mode A1 and the second fixing mode A2 as the valve operation modes of the oil control valve 82, but the valve operation modes may be changed as follows.

(A) One of the first fixing mode A1 and the second fixing mode A2 may be omitted.

(B) At least one of the first fixing mode A1 and the second fixing mode A2 may be replaced by at least one of the third fixing mode B1 to the fifth fixing mode B3 according to the above-described modification.

According to the above-described embodiment (FIG. 5), the supply/drainage modes of hydraulic oil to/from the advance chamber 47, the retard chamber 48, and the release chambers 64 and 74 are controlled by the single oil control valve 82, but the structure of the oil control valve 82 may be changed as follows. Namely, the oil control valve 82 may be replaced by a first oil control valve that controls the supply/drainage modes of hydraulic oil to/from the advance chamber 47 and the retard chamber 48, and a second oil control valve that controls the supply/drainage modes of hydraulic oil to/from the release chambers 64 and 74.

According to the above-described embodiment (FIG. 3), the first engaging groove 66 including the first lower-stage groove 67 and the first upper-stage groove 68 is formed in the first restricting mechanism 60, but the first engaging groove 66 may be changed as at least one of (A) and (B) below.

(A) The first lower-stage groove 67 is replaced by a hole that causes the first restricting pin 61 to be fitted therein is formed to fix the rotational phase of the vane rotor 45 at the intermediate rotational phase. The hole is formed at the position corresponding to the first restricting pin 61 in the circumferential direction when the vane rotor 45 is in the intermediate rotational phase. According to this structure, the end of the first upper-stage groove 68 is extended to the hole.

(B) The first upper-stage groove 68 is omitted.

According to the above-described embodiment (FIG. 3), the second engaging groove 76 including the second lower-stage groove 77 and the second upper-stage groove 78 is formed in the second restricting mechanism 70, but the second engaging groove 76 may be changed as at least one of (A) and (B) below.

(A) Instead of the second lower-stage groove 77, a hole that causes the second restricting pin 71 to be fitted therein is formed to fix the rotational phase of the vane rotor 45 at the intermediate rotational phase. The hole is formed at the position corresponding to the second restricting pin 71 in the circumferential direction when the vane rotor 45 is in the intermediate rotational phase.

(B) The second upper-stage groove 78 is omitted.

According to the above-described embodiment (FIG. 3), the first restricting pin 61 and the second restricting pin 71 are provided on the vane rotor 45, and the first engaging groove 66 and the second engaging groove 76 are formed in the housing rotor 41, but the structure regarding the restricting pins 61 and 71 and the engaging grooves 66 and 76 may be changed as follows. Namely, at least one of the first engaging groove 66 and the second engaging groove 76 may be formed in the vane rotor 45, and at least one of the first restricting pin 61 and the second restricting pin 71 may be provided on the housing rotor 41.

According to the above-described embodiment (FIG. 2), the valve timing restricting mechanism 50, in which the first restricting pin 61 and the second restricting pin 71 move in the axial direction relative to the vanes 45A, is employed, but the structure regarding the restricting pins 61 and 71 may be changed as follows. Namely, the valve timing restricting mechanism 50 may be structured such that at least one of the first restricting pin 61 and the second restricting pin 71 executes the protruding operation and the retracting operation in the radial direction relative to the vanes 45A. In this case, at least one of engaging grooves corresponding to the first engaging groove 66 and the second engaging groove 76 is formed in the housing rotor 41 in correspondence with the operation of the first restricting pin 61 and the second restricting pin 71 relative to the vanes 45A.

According to the above-described embodiment (FIG. 4), the valve timing restricting mechanism 50 for fixing the valve timing VT at the intermediate phase VTmdl is provided to the variable valve actuation device 20. Instead of this, or in addition to this, a phase fixing mechanism for fixing the valve timing VT at the most retarded phase VTmin may be provided to the variable valve actuation device 20.

According to the above-described embodiment (FIG. 4), the valve timing VT to be fixed by the valve timing restricting mechanism 50 is set to the intermediate phase VTmdl, but other valve timing VT, except for the most advanced phase VTmax, may be set as the valve timing VT to be fixed by the valve timing restricting mechanism 50.

According to the above-described embodiment (FIG. 4), the valve timing restricting mechanism 50 that has the function of fixing the valve timing VT at the intermediate phase VTmdl, that is, the function of disabling the rotation of the vane rotor 45 relative to the housing rotor 41 is employed, but the structure of the valve timing restricting mechanism 50 may be changed as follows. Namely, the valve timing restricting mechanism 50 may be changed to have the functions of restricting the advance of the valve timing VT from the intermediate phase VTmdl, and permitting the retard of the valve timing VT from this state. A specific example of such a phase variable mechanism includes, for example, the valve timing restricting mechanism 50 of the above-described embodiment from which the second restricting mechanism 70 is omitted.

According to the above-described modification, the valve timing VT, at which the relative rotation of the vane rotor 45 in the advancing direction is restricted, may be set at the valve timing VT different from the intermediate phase VTmdl. However, the most advanced phase VTmax is excluded.

According to the above-described embodiment (FIG. 3), the variable valve timing mechanism 40 of the hydraulic pressure type is employed, but an electric variable valve timing mechanism may be employed.

According to the above-described embodiment (FIG. 7), the pressing-down operation of the accelerator pedal 2 is regarded as the output increase requesting operation in the phase advancing control, and the control of the variable valve timing mechanism 40 and the like are executed. However, an operation other than the pressing-down operation of the accelerator pedal 2 may serve as the output increase requesting operation of the vehicle driver. For example, when an accelerator lever capable of being operated by hand is provided in the vehicle, the operation of the lever may serve as the output increase requesting operation. Also, when operating means for adjusting the output of the internal combustion engine is provided in the vehicle, the operation of the operating means may serve as the output increase requesting operation. In both cases, the effects according to the above-described embodiment can be obtained by executing the control of the variable valve timing mechanism 40 and the like according to the similar mode to that of the phase advancing control of the above-described embodiment.

The structure of the variable valve actuation device for an internal combustion engine, to which the present invention is applied, is not limited to the structure of the above-described embodiment. Namely, the present invention may be applied to the variable valve actuation device having any structure as long as the variable valve actuation device includes a phase changing mechanism and a phase fixing mechanism. In this case, it is also possible to obtain the advantages according to the above-described embodiment.

DESCRIPTION OF THE REFERENCE NUMERALS

1 . . . internal combustion engine, 2 . . . accelerator pedal, 10 . . . engine body, 11 . . . cylinder block, 12 . . . cylinder head, 13 . . . oil pan, 14 . . . combustion chamber, 15 . . . crankshaft, 16 . . . throttle valve, 17 . . . ignition plug, 20 . . . variable valve actuation device, 21 . . . intake valve, 22 . . . intake cam shaft, 23 . . . exhaust valve, 24 . . . exhaust cam shaft, 30 . . . variable valve lift mechanism (duration changing mechanism), 40 . . . variable valve timing mechanism (phase changing mechanism), 41 . . . housing rotor, 42 . . . housing body, 42A . . . partition wall, 43 . . . sprocket, 44 . . . cover, 45 . . . vane rotor, 45A . . . vane, 46 . . . accommodating chamber, 47 . . . advance chamber, 48 . . . retard chamber, 50 . . . valve timing restricting mechanism (phase restricting mechanism), 60 . . . first restricting mechanism, 61 . . . first restricting pin, 62 . . . first restricting spring, 63 . . . first restriction chamber, 64 . . . first release chamber, 65 . . . first spring chamber, 66 . . . first engaging groove, 66A . . . first advanced end portion, 66B . . . first retarded end portion, 66C . . . second retarded end portion, 67 . . . first lower-stage groove, 68 . . . first upper-stage groove, 70 . . . second restricting mechanism, 71 . . . second restricting pin, 72 . . . second restricting spring, 73 . . . second restriction chamber, 74 . . . second release chamber, 75 ... second spring chamber, 76 ... second engaging groove, 76A ... second advanced end portion, 76B ... third retarded end portion, 76C ... fourth retarded end portion, 77 ... second lower-stage groove, 78 ... second upper-stage groove, 80 ... hydraulic mechanism, 81 ... oil pump, 82 ... oil control valve, 90 ... hydraulic oil path, 91 ... supply oil path, 92 ... drainage oil path, 93 ... phase advancing oil path, 94 ... phase retarding oil path, 95 ... releasing oil path, 100 ... control device, 101 ... electronic control unit, 102 ... crank position sensor, 103 ... cam position sensor, 104 ... throttle position sensor, 105 ... accelerator position sensor.

The invention claimed is:

1. A variable valve actuation device for an internal combustion engine, comprising a phase changing mechanism that changes valve timing of an intake valve and a phase restricting mechanism that restricts the valve timing from being more advanced than a specific phase, wherein
    an operating state of the phase changing mechanism in which the phase restricting mechanism restricts the valve timing from being advanced is defined as a phase restricting state,
    an operating state of the phase changing mechanism in which the valve timing is allowed to be more advanced than the specific phase is defined as a phase releasing state,
    an operation executed by a vehicle driver to increase output of the internal combustion engine is defined as an output increase requesting operation,
    the variable valve actuation device includes a control section, and
    after the output increase requesting operation is executed while the operating state of the phase changing mechanism is the phase restricting state, and after the operating state of the phase changing mechanism is changed from the phase restricting state to the phase releasing state in response to the output increase requesting operation, the control section executes a torque limiting control for limiting increase in torque of the internal combustion engine caused by advancing of the valve timing.

2. The variable valve actuation device for an internal combustion engine according to claim 1, wherein
    an increase rate of the torque of the internal combustion engine when the torque limiting control is executed is defined as a first torque increase rate,
    an increase rate of the torque of the internal combustion engine after the output increase requesting operation is executed while the operating state of the phase changing mechanism is the phase releasing state is defined as a second torque increase rate, and
    the control section executes the torque limiting control such that the first torque increase rate is smaller than the second torque increase rate.

3. The variable valve actuation device for an internal combustion engine according to claim 1, wherein
    a certain period after the operating state of the phase changing mechanism is changed from the phase restricting state to the phase releasing state is defined as a post-releasing period, and
    the control section executes the torque limiting control such that an increase rate of the torque of the internal combustion engine in the post-releasing period is less than a predetermined rate.

4. The variable valve actuation device for an internal combustion engine according to claim 1, wherein
    an increase rate of the torque of the internal combustion engine during execution of the torque liming control is defined as a limitation-period increase rate,
    an increase rate of the torque of the internal combustion engine in a case in which the torque liming control is not executed after the operating state of the phase changing mechanism is changed from the phase restricting state to the phase releasing state is defined as a normal-period increase rate, and
    the control section executes the torque limiting control such that the limitation-period increase rate is less than the normal-period increase rate.

5. The variable valve actuation device for an internal combustion engine according to claim 1, wherein the torque limiting control includes control for retarding ignition timing.

6. The variable valve actuation device for an internal combustion engine according to claim 5, wherein the control for retarding ignition timing includes:
    control for setting a retardation correcting amount of the ignition timing after the operating state of the phase changing mechanism is changed from the phase restricting state to the phase releasing state in response to the output increase requesting operation; and
    control for decreasing the retardation correcting amount in accordance with lapse of time.

7. The variable valve actuation device for an internal combustion engine according to claim 1, wherein
    the torque limiting control includes control for reducing a throttle opening degree, which is an opening degree of a throttle valve of the internal combustion engine.

8. The variable valve actuation device for an internal combustion engine according to claim 7, wherein the control for reducing the throttle opening degree includes:
    control for setting a reduction correcting amount of the throttle opening degree after the operating state of the phase changing mechanism is changed from the phase restricting state to the phase releasing state in response to the output increase requesting operation; and
    control for decreasing the reduction correcting amount in accordance with lapse of time.

9. The variable valve actuation device for an internal combustion engine according to claim 1, further comprising a duration changing mechanism that changes the duration of the intake valve,
    wherein the torque limiting control includes control for decreasing the duration.

10. The variable valve actuation device for an internal combustion engine according to claim 9, wherein the control for decreasing the duration includes:
    control for setting a duration decrease correcting amount after the operating state of the phase changing mechanism is changed from the phase restricting state to the phase releasing state in response to the output increase requesting operation; and
    control for decreasing the duration decrease correcting amount in accordance with lapse of time.

* * * * *